US012651056B2

(12) United States Patent (10) Patent No.: US 12,651,056 B2
Morita et al. (45) Date of Patent: Jun. 9, 2026

(54) INFORMATION PROCESSING SYSTEM, INFORMATION PROCESSING METHOD, AND STORAGE MEDIUM

(71) Applicant: NEC Corporation, Tokyo (JP)

(72) Inventors: Tsuyoshi Morita, Tokyo (JP); Shinya Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/835,398

(22) PCT Filed: Mar. 11, 2022

(86) PCT No.: PCT/JP2022/010811
§ 371 (c)(1),
(2) Date: Aug. 2, 2024

(87) PCT Pub. No.: WO2023/170902
PCT Pub. Date: Sep. 14, 2023

(65) Prior Publication Data
US 2025/0139225 A1 May 1, 2025

(51) Int. Cl.
G06F 21/31 (2013.01)
G06F 21/41 (2013.01)
G06F 21/45 (2013.01)
(52) U.S. Cl.
CPC .............. G06F 21/45 (2013.01); G06F 21/41 (2013.01)
(58) Field of Classification Search
None
See application file for complete search history.

(56) References Cited

U.S. PATENT DOCUMENTS

2017/0163636 A1 6/2017 Nishida

FOREIGN PATENT DOCUMENTS

| JP | 2005-519365 A | | 6/2005 |
|----|----|----|----|
| JP | 2007-293760 A | | 11/2007 |
| JP | 2007299303 A | * | 11/2007 |
| JP | 2010-086435 A | | 4/2010 |
| JP | 4615247 B2 | | 1/2011 |
| JP | 2011-022826 A | | 2/2011 |

(Continued)

OTHER PUBLICATIONS

International Search Report for PCT Application No. PCT/JP2022/010811, mailed on May 24, 2022.

(Continued)

*Primary Examiner* — Nelson S. Giddins
(74) *Attorney, Agent, or Firm* — Sughrue Mion, PLLC

(57) ABSTRACT

Attained is an example object to allow a service which has not supported linkage of authentication information to newly support such linkage, while reducing a burden on a user. An information processing system (1) includes: an acquisition section (11) for acquiring a first linkage request from a first server that provides a first service, the first linkage request including first authentication information used by the first server to carry out authentication of a user; and a linkage section (12) for generating, based on the first linkage request, integrated authentication information which is to be linked to the first authentication information, and causing a storage apparatus to store the first authentication information and the integrated authentication information.

9 Claims, 16 Drawing Sheets

(56)                    References Cited

FOREIGN PATENT DOCUMENTS

| JP | 2015-148940 A | | 8/2015 |
|----|---------------|---|--------|
| JP | 2017-107343 A | | 6/2017 |
| JP | 2019091104 A | * | 6/2019 |
| JP | 2020-068031 A | | 4/2020 |

OTHER PUBLICATIONS

OneLogin, Inc., "Dev Overview of OpenIDConnect", [retrieved on Feb. 17, 2022], pp. 1-3, The Internet <URL: https://developers.onelogin.com/openid-connect>.
JP Office Action for JP Application No. 2024-505792, mailed on Sep. 30, 2025 with English Translation.

* cited by examiner

START

ACQUIRE FIRST LINKAGE REQUEST ~S11

GENERATE INTEGRATED AUTHENTICATION INFORMATION TO BE LINKED TO FIRST AUTHENTICATION INFORMATION ~S12

END

| USER ID | PASSWORD |
|---------|----------|
| A@mail | P@ss |

R1

INDIVIDUAL AUTHENTICATION INFORMATION

| USER ID | PASSWORD |
|---------|----------|
| officeID | p@ssword |

R2

INDIVIDUAL AUTHENTICATION INFORMATION

FIG. 6
50
| UUID | SERVICE IDENTIFICATION INFORMATION | ID | PASSWORD |
|------|------------------------------------|-----|----------|
|      |                                    |     |          | R
| UUID | SERVICE IDENTIFICATION INFORMATION | ID | PASSWORD |
|------|------------------------------------|-----|----------|
| UUID001 | A | A@mail | P@ss | R3 |
| UUID001 | U | A@mail | password | R4 |
|      |                                    |     |          |
| UUID | SERVICE IDENTIFICATION INFORMATION | ID | PASSWORD |
|------|------------------------------------|-----|----------|
| UUID001 | A | A@mail | P@ss |
| UUID001 | U | A@mail | password |
| UUID001 | B | officeID | p@ssword | R5 |
|      |                                    |     |          |

FIG. 10

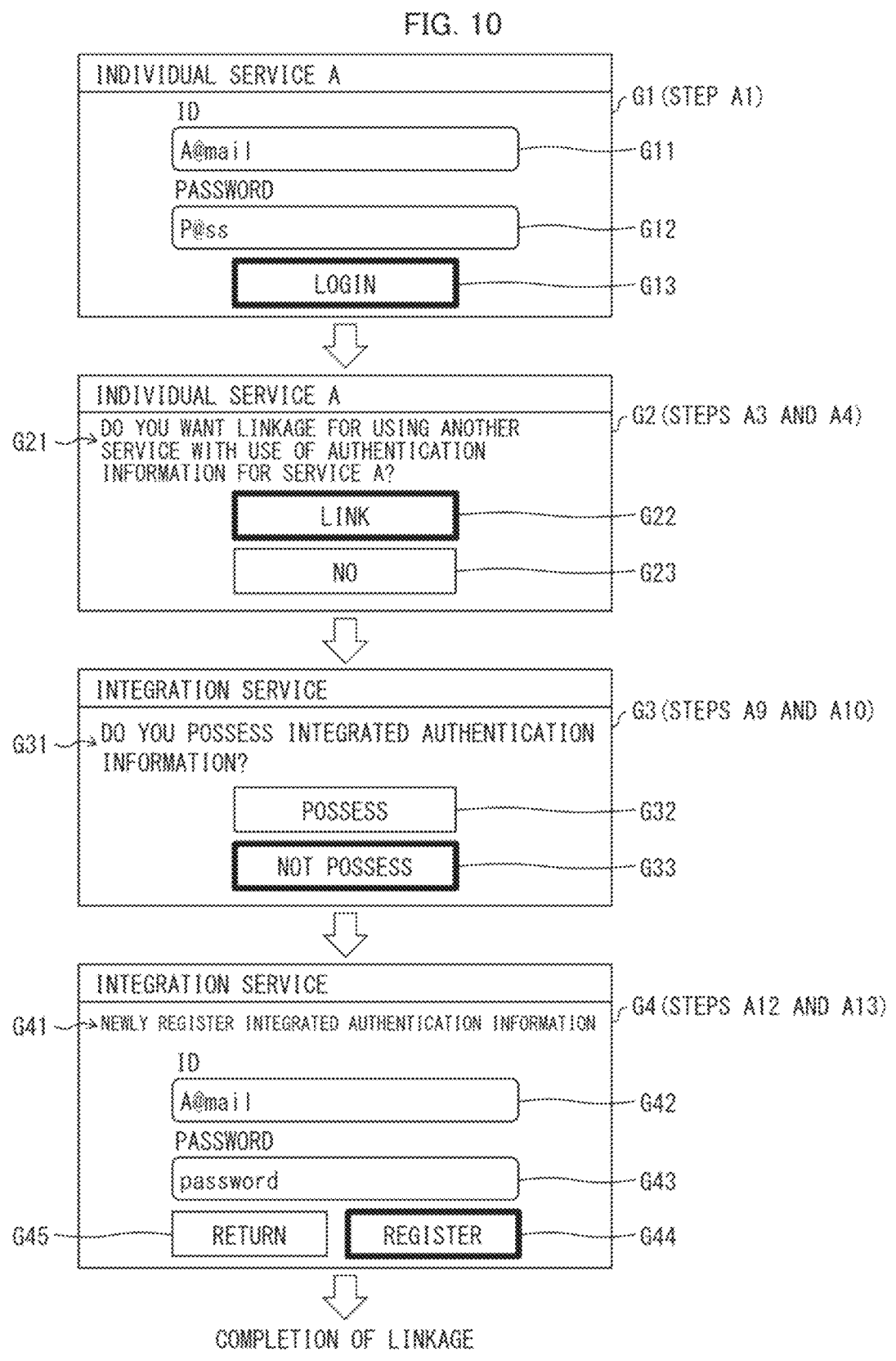

INDIVIDUAL SERVICE A — G1 (STEP A1)

ID

A@mail — G11

PASSWORD

P@ss — G12

LOGIN — G13

INDIVIDUAL SERVICE A — G2 (STEPS A3 AND A4)

G21 — DO YOU WANT LINKAGE FOR USING ANOTHER SERVICE WITH USE OF AUTHENTICATION INFORMATION FOR SERVICE A?

LINK — G22

NO — G23

INTEGRATION SERVICE — G3 (STEPS A9 AND A10)

G31 — DO YOU POSSESS INTEGRATED AUTHENTICATION INFORMATION?

POSSESS — G32

NOT POSSESS — G33

INTEGRATION SERVICE — G4 (STEPS A12 AND A13)

G41 — NEWLY REGISTER INTEGRATED AUTHENTICATION INFORMATION

ID

A@mail — G42

PASSWORD password — G43

G45 — RETURN    REGISTER — G44

COMPLETION OF LINKAGE

FIG. 12

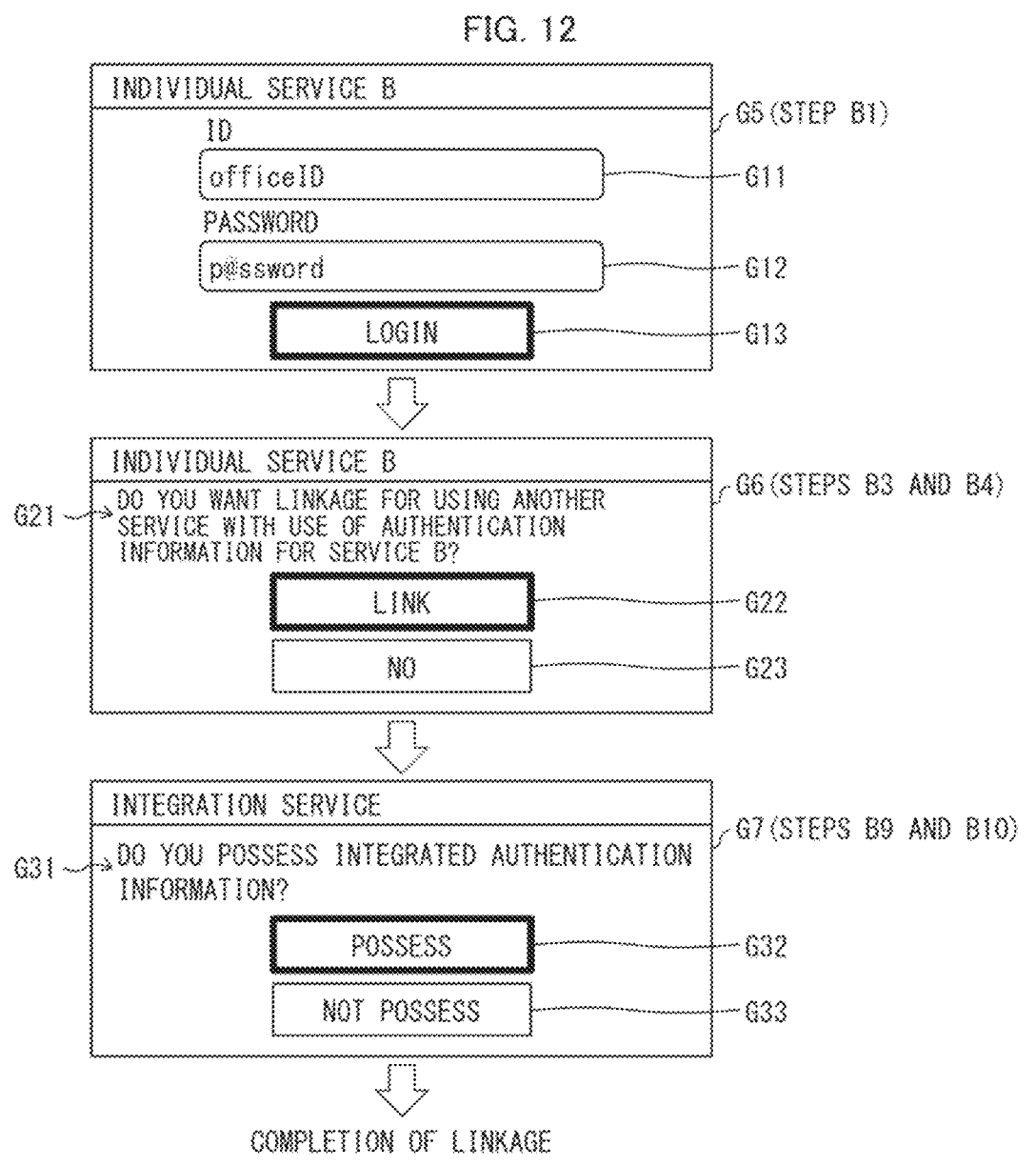

INDIVIDUAL SERVICE B — G5 (STEP B1)

ID officeID — G11

PASSWORD p@ssword — G12

LOGIN — G13

INDIVIDUAL SERVICE B — G6 (STEPS B3 AND B4)

G21 → DO YOU WANT LINKAGE FOR USING ANOTHER SERVICE WITH USE OF AUTHENTICATION INFORMATION FOR SERVICE B?

LINK — G22

NO — G23

INTEGRATION SERVICE — G7 (STEPS B9 AND B10)

G31 → DO YOU POSSESS INTEGRATED AUTHENTICATION INFORMATION?

POSSESS — G32

NOT POSSESS — G33

COMPLETION OF LINKAGE

Figure 15:
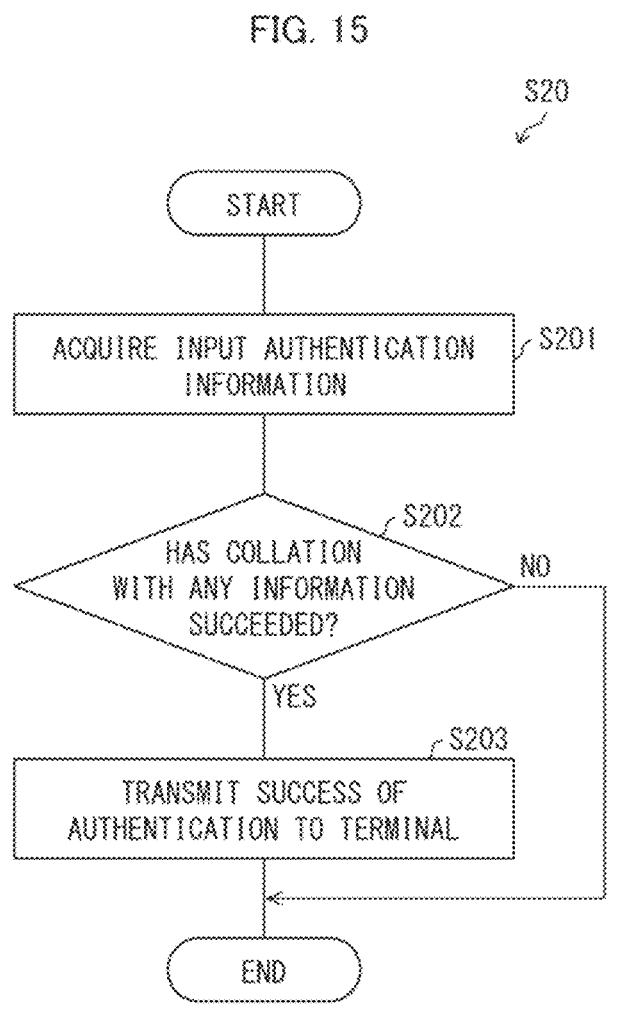

```
        ┌─────────────┐
        │    START    │
        └─────────────┘
               │
   ┌───────────────────────────┐
   │ ACQUIRE INPUT AUTHENTICATION │  S201
   │        INFORMATION         │
   └───────────────────────────┘
               │
          ╱─────────╲
         ╱  S202     ╲
        ╱ HAS COLLATION ╲   NO
       ⟨ WITH ANY INFORMATION ⟩────┐
        ╲  SUCCEEDED?  ╱           │
         ╲           ╱            │
          ╲─────────╱             │
             │ YES                 │
   ┌───────────────────────────┐  S203
   │   TRANSMIT SUCCESS OF      │   │
   │ AUTHENTICATION TO TERMINAL │   │
   └───────────────────────────┘   │
               │                    │
               │◄───────────────────┘
        ┌─────────────┐
        │     END     │
        └─────────────┘
```

INFORMATION PROCESSING SYSTEM, INFORMATION PROCESSING METHOD, AND STORAGE MEDIUM

This application is a National Stage Entry of PCT/JP2022/ 010811 filed on Mar. 11, 2022, the contents of all of which are incorporated herein by reference, in their entirety.

TECHNICAL FIELD

The present invention relates to a technique to link pieces of authentication information together.

BACKGROUND ART

A technique to link pieces of authentication information together is known. The authentication information is, for example, information including user identification information (e.g., a user name, a user ID, and the like) and personal identification information (e.g., a password, biometric information, and the like).

For example, in the technique disclosed in Non-Patent Literature 1, an approval server carries out an authentication procedure with a user. In a case where the user has been successfully verified to be an owner of a user ID, the approval server issues an ID token with a signature. A service server confirms validity of the user ID by verification of the signature included in the ID token, and provides a service to the user. The user uses a plurality of services using the user ID registered in the approval server.

For example, in the technique disclosed in Patent Literature 1, in a case where a user who has logged in with an individual log-in ID on an individual log-in screen of a service server is a single sign-on (SSO) user, redirection is carried out from the service server to an SSO authentication server. The SSO authentication server carries out SSO authentication of the user using an SSO log-in ID which is associated with the individual log-in ID.

CITATION LIST

Non-Patent Literature

[Non-patent Literature 1]
    "Dev Overview of OpenIDConnect", OneLogin, Inc., [retrieved on Feb. 17, 2022], The Internet <URL: https:// developers.onelogin.com/openid-connect>

Patent Literature

[Patent Literature 1]
    Japanese Patent Application Publication Tokukai No. 2007-293760

SUMMARY OF INVENTION

Technical Problem

Here, a case will be considered in which a service that has not supported linkage of authentication information until then is to newly start supporting such linkage. In such a case, the techniques disclosed in Patent Literatures 1 and 2 imposes a burden to an existing user of such a service, specifically, the existing user will no longer be able to use the service-specific authentication information which the existing user has used until then. Moreover, in order to continue using the service, there is a burden of newly registering authentication information in the approval server (SSO authentication server).

An example aspect of the present invention is accomplished in view of the above problems, and an example object thereof is to provide a technique for allowing a service which has not supported linkage of authentication information to newly support such linkage, while reducing a burden on a user.

Solution to Problem

An information processing system in accordance with an example aspect of the present invention includes at least one processor, the at least one processor carrying out: an acquisition process of acquiring a first linkage request from a first server that provides a first service, the first linkage request including first authentication information used by the first server to carry out authentication of a user; and a linkage process of generating, based on the first linkage request, integrated authentication information which is to be linked to the first authentication information, and causing a storage apparatus to store the first authentication information and the integrated authentication information.

An information processing method in accordance with an example aspect of the present invention includes: acquiring a first linkage request from a first server that provides a first service, the first linkage request including first authentication information used by the first server to carry out authentication of a user; and generating, based on the first linkage request, integrated authentication information which is to be linked to the first authentication information, and causing a storage apparatus to store the first authentication information and the integrated authentication information.

A non-transitory storage medium in accordance with an example aspect of the present invention stores a program for causing a computer to function as an information processing system, the program causing the computer to carry out: an acquisition process of acquiring a first linkage request from a first server that provides a first service, the first linkage request including first authentication information used by the first server to carry out authentication of a user; and a linkage process of generating, based on the first linkage request, integrated authentication information which is to be linked to the first authentication information, and causing a storage apparatus to store the first authentication information and the integrated authentication information.

Advantageous Effects of Invention

According to an example aspect of the present invention, it is possible to allow a service which has not supported linkage of authentication information to newly support such linkage, while reducing a burden on a user.

BRIEF DESCRIPTION OF DRAWINGS

FIG. 4 is a diagram illustrating an example of information stored in a user database illustrated in FIG. 3.

FIG. 5 is a diagram illustrating an example of information stored in another user database illustrated in FIG. 3.

FIG. 6 is a diagram illustrating an example of information stored in an integrated database illustrated in FIG. 3.

FIG. 10 is a diagram illustrating a screen example which is output to a terminal in an example of the linkage process illustrated in FIG. 9.

FIG. 12 is a diagram illustrating a screen example which is output to a terminal in another example of the linking method illustrated in FIG. 11.

FIG. 15 is a flowchart illustrating a flow of an authentication process which is carried out by an authentication server in the authentication method illustrated in FIG. 13.

EXAMPLE EMBODIMENTS

First Example Embodiment

The following description will discuss a first example embodiment of the present invention in detail, with reference to the drawings. The present example embodiment is a basic form of example embodiments described later.
<Configuration of Information Processing System 1>

Figures 1, 2:
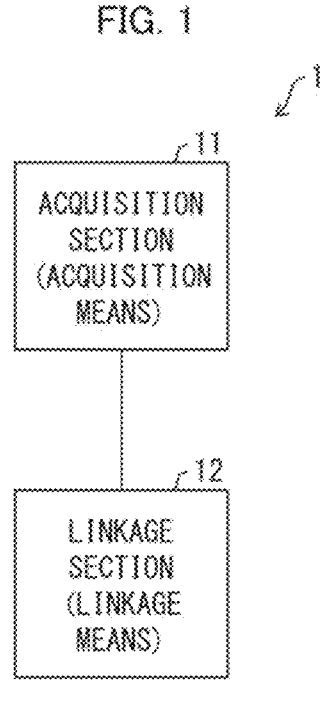
FIG. 1 is a block diagram illustrating a configuration of an information processing system in accordance with a first example embodiment of the present invention.
FIG. 2 is a flowchart illustrating a flow of an information processing method in accordance with the first example embodiment of the present invention.

The following description will discuss a configuration of an information processing system 1 in accordance with the present example embodiment, with reference to FIG. 1. FIG. 1 is a block diagram illustrating the configuration of the information processing system 1.

As illustrated in FIG. 1, the information processing system 1 includes an acquisition section 11 and a linkage section 12. The acquisition section 11 is an example configuration for realizing the acquisition means recited in claims. The linkage section 12 is an example configuration for realizing the linkage means recited in claims. The acquisition section 11 acquires a first linkage request from a first server that provides a first service, the first linkage request including first authentication information used by the first server to carry out authentication of a user. The linkage section 12 generates, based on the first linkage request, integrated authentication information which is to be linked to the first authentication information, and causes a storage apparatus to store the first authentication information and the integrated authentication information. Details of each of these sections will be described in "Flow of information processing method S1" later.
<Flow of Information Processing Method S1>

The information processing system 1 configured as described above carries out an information processing method S1 in accordance with the present example embodiment. The following description will discuss a flow of the information processing method S1, with reference to FIG. 2. FIG. 2 is a flowchart illustrating the flow of the information processing method S1. As illustrated in FIG. 2, the information processing method S1 includes steps S11 and S12.

In step S11, the acquisition section 11 acquires a first linkage request from a first server that provides a first service, the first linkage request including first authentication information used by the first server to carry out authentication of a user.

The first authentication information is authentication information which is used by a user to use the first service. The first authentication information is, for example, information which has been registered by the user in the first service. The first authentication information includes, for example, user identification information for identifying a user in the first service, and personal identification information for personal identification. Examples of the personal identification information include, but not limited to, a password, biometric information, and the like.

The first linkage request is, for example, information for requesting linkage between the first authentication information and the integrated authentication information. The first linkage request may be, for example, information for requesting linkage with the integrated authentication information in order that the first authentication information can be used in another service.

In step S12, the linkage section 12 generates, based on the first linkage request, integrated authentication information which is to be linked to the first authentication information, and causes a storage apparatus to store the first authentication information and the integrated authentication information.

Here, the integrated authentication information includes, for example, user identification information for identifying a user in a linkage service which is provided by the information processing system 1, and personal identification information for personal identification. Examples of the personal identification information include, but not limited to, a password, biometric information, and the like.

Here, the storage apparatus may be, for example, an apparatus which is referred to by an authentication section that carries out authentication of a user in the linkage service which is provided by the information processing system 1. For example, the authentication section may carry out authentication of a user using at least one selected from the group consisting of the first authentication information and the integrated authentication information which are stored in the storage apparatus. Specifically, for example, in a case where collation has succeeded between (i) input authentication information authenticated by the user and (ii) at least one selected from the group consisting of the first authentication information and the integrated authentication information, the authentication section may determine that authentication of the user has succeeded. Such an authentication section may be included in the information processing system 1 or may be included in an external apparatus.

<Program Implementation Example>

In a case where the information processing system 1 is configured by a computer, the following program is stored in a memory which is referred to by the computer. The program causes a computer to function as the information processing system 1, the program causing the computer to function as: an acquisition means for acquiring a first linkage request from a first server that provides a first service, the first linkage request including first authentication information used by the first server to carry out authentication of a user; and a linkage means for generating, based on the first linkage request, integrated authentication information which is to be linked to the first authentication information, and causing a storage apparatus to store the first authentication information and the integrated authentication information. In this case, the above described information processing system 1 and information processing method S1 are each realized when a processor included in the computer reads and executes the program.

Example Advantage of Present Example Embodiment

As described above, in the information processing system 1, the information processing method S1, and the program in accordance with the present example embodiment, employed is a configuration of: acquiring a first linkage request from a first server that provides a first service, the first linkage request including first authentication information used by the first server to carry out authentication of a user; and generating, based on the first linkage request, integrated authentication information which is to be linked to the first authentication information, and causing a storage apparatus to store the first authentication information and the integrated authentication information.

Therefore, in a case where the first server has not supported linkage of authentication information and newly starts such linkage, integrated authentication information which is to be linked to the first authentication information is generated based on a linkage request from the first server. As a result, it is possible to reduce labor of an existing user of the first service to link authentication information. As such, according to the present example embodiment, it is possible to bring about an example advantage of allowing a service which has not supported linkage of authentication information to newly support such linkage, while reducing a burden on a user.

Second Example Embodiment

The following description will discuss a second example embodiment of the present invention in detail, with reference to the drawings. The same reference numerals are given to constituent elements which have functions identical with those described in the first example embodiment, and descriptions as to such constituent elements are omitted as appropriate.

<Overview of Information Processing System 1A>

The information processing system 1A in accordance with the present example embodiment is a system that provides an integration service for integrating pieces of authentication information. The integration service includes a linkage service and an authentication service. In the linkage service, pieces of individual authentication information which have been individually registered by the same user in a plurality of services are linked together by integrated authentication information. In the authentication service, a user is authenticated using any one of the individual authentication information and the integrated authentication information. By using the integration service, the user can use each of services using any one of the individual authentication information and the integrated authentication information.

Hereinafter, a service in which individual authentication information has been registered by a user is also referred to as an individual service. Note, however, that when it is not necessary to particularly distinguish between the individual service, the integration service, the linkage service, and the authentication service, those services are each simply referred to also as a service.

Details of the individual authentication information and the integrated authentication information will be described later. In a case where it is not necessary to particularly distinguish between these pieces of information, the individual authentication information and the integrated authentication information are each simply referred to as authentication information. The term "authentication information" refers to information including user identification information and personal identification information. The user identification information is information for identifying a user in each service. Examples of the user identification information include, but not limited to, information called a user ID. The personal identification information is information for confirming identification of a user. Examples of the personal identification information include, but not limited to, a password, biometric information, and the like.

<Configuration of Information Processing System 1A>

Figure 3:
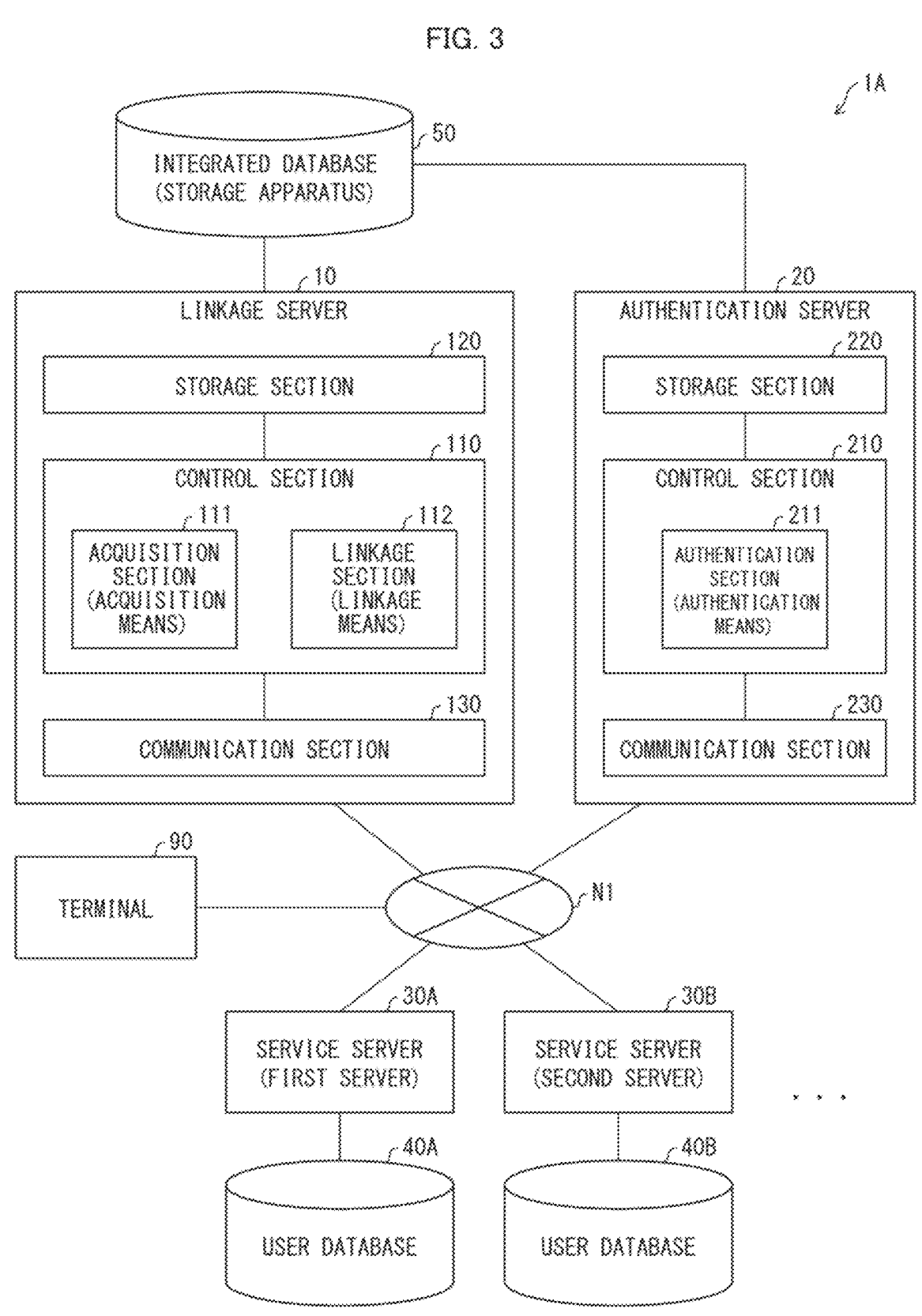
FIG. 3 is a block diagram illustrating a configuration of an information processing system in accordance with a second example embodiment of the present invention.

The following description will discuss a configuration of an information processing system 1A in accordance with the present example embodiment, with reference to FIG. 3. FIG. 3 is a block diagram illustrating the configuration of the information processing system 1A.

As illustrated in FIG. 3, the information processing system 1A includes a linkage server 10, an authentication server 20, service servers 30A, 30B, and so forth, user databases 40A, 40B, and so forth, an integrated database 50, and a terminal 90. Hereinafter, when it is not necessary to particularly distinguish between the service servers 30A, 30B, and so forth, the service servers 30A, 30B, and so forth are each simply referred to also as a service server 30. When it is not necessary to particularly distinguish between the user databases 40A, 40B, and so forth, the user databases 40A, 40B, and so forth are each simply referred to as a user database 40.

FIG. 3 indicates two service servers 30 and two user databases 40. Note, however, that the numbers of the apparatuses may each be three or more. Although FIG. 3 indicates a single terminal 90, the number of terminals 90 may be two or more.

The linkage server 10 is connected to the service servers 30 and the terminal 90 via a network N1. The authentication server 20 is connected to the service servers 30 and the terminal 90 via the network N1. The network N1 is constituted by, for example, a wireless local area network (LAN), a wired LAN, a wide area network (WAN), a public network, a mobile data communication network, another network, or a combination of some of or all of these networks.

The linkage server 10 and the authentication server 20 are communicably connected to the integrated database 50. The service server 30A is communicably connected to the user database 40A, and the service server 30B is communicably connected to the user database 40B.

Note that the information processing system 1A only needs to include at least the linkage server 10 and the authentication server 20. Some of or all of the other apparatuses may be provided outside the information processing system 1A.

(Linkage Server 10)

The following description will discuss a configuration of the linkage server 10, with reference to FIG. 3. The linkage server 10 is a server that provides the foregoing linkage service. The linkage server 10 includes a control section 110, a storage section 120, and a communication section 130. The control section 110 comprehensively controls the sections of the linkage server 10. The storage section 120 stores various kinds of data used by the control section 110. The communication section 130 carries out transmission and reception of data with the other apparatuses under control of the control section 110.

The control section 110 includes an acquisition section 111 and a linkage section 112. The acquisition section 111 is configured in a manner substantially identical with that of the acquisition section 11 in accordance with the first example embodiment, except at least that the acquisition section 111 acquires linkage requests from the plurality of service servers 30. The linkage section 112 is configured in a manner substantially identical with that of the linkage section 12 in accordance with the first example embodiment, except at least that the linkage section 112 links a plurality of pieces of individual authentication information to the integrated authentication information, and causes the integrated database 50 to store the plurality of pieces of individual authentication information. Details of the acquisition section 111 and the linkage section 112 will be described in "Overview of linking method S100" and the like later.

(Authentication Server 20)

The following description will discuss a configuration of the authentication server 20, with reference to FIG. 3. The authentication server 20 is a server that provides the foregoing authentication service. The authentication server 20 includes a control section 210, a storage section 220, and a communication section 230. The control section 210 comprehensively controls the sections of the authentication server 20. The storage section 220 stores various kinds of data used by the control section 210. The communication section 230 carries out transmission and reception of data with the other apparatuses under control of the control section 210.

The control section 210 includes an authentication section 211. The authentication section 211 carries out authentication of a user with reference to the integrated database 50. The authentication section 211 is an example configuration for realizing the authentication means recited in claims. Details of the authentication section 211 will be described in "Overview of authentication method S200" and the like later.

(Service Server 30)

The following description will discuss a configuration of the service server 30, with reference to FIG. 3. The service server 30 is an example of the first server or the second server recited in claims. The service server 30 is a server that provides an individual service to a user. Specifically, the service server 30 carries out, via the network N1, transmission and reception of information pertaining to an individual service with a terminal 90 that is used by the user. The individual service is a service different from both of the linkage service that is provided by the linkage server 10 and the authentication service that is provided by the authentication server 20. Specific examples of the individual service include, but not limited to, a service of selling goods, a service of distributing information, an education-related service, a medical-related service, and the like.

Here, the service server 30 had an unsupporting period of not supporting the integration service in the past but currently supports the integration service. It is assumed that the service server 30 has provided, during the unsupporting period, individual services to users who have been individually authenticated based on pieces of individual authentication information. After the start of supporting the integration service, the service server 30 provides an individual service to a user who has been individually authenticated based on a piece of individual authentication information, and also to a user who has been authenticated by the authentication server 20. In a case of carrying out authentication based on individual authentication information, the service server 30 refers to the user database 40 (described later). The service server 30 carries out, via the network N1, transmission and reception of information pertaining to the integration service with the terminal 90, the linkage server 10, and the authentication server 20. If necessary, the service server 30 causes a memory to store information pertaining to the individual service and the integration service.

The following description will discuss an example in which the service server 30A provides an individual service A, and the service server 30B provides an individual service B which is different from the individual service A. In the present example embodiment, it is assumed that the service servers 30 each provide a single service.

(User Database 40)

The following description will discuss the user database 40, with reference to FIG. 3. The user database 40 is provided so as to correspond to the service server 30. The user database 40 stores individual authentication information of a user.

For example, information stored in the user database 40 is registered by the corresponding service server 30 and is referred to by the service server 30. Here, "registration" means that information is stored in the user database 40. It is preferable that the user database 40 is accessible from specific apparatuses including the corresponding service server 30, and is not accessible from other apparatuses. For example, in the present example embodiment, it is assumed that the user database 40A is not accessible from the linkage server 10, the authentication server 20, and the service server 30B. Moreover, it is assumed that the user database 40B is not accessible from the linkage server 10, the authentication server 20, and the service server 30A.

(Individual Authentication Information)

The individual authentication information is authentication information used by the service server 30 to carry out authentication. The individual authentication information is an example of the first authentication information or the second authentication information recited in claims. The user database 40A stores individual authentication information of a user who uses the individual service A provided by the service server 30A. The user database 40B stores individual authentication information of a user who uses the individual service B provided by the service server 30B. For example, such individual authentication information is registered during an unsupporting period in which the service server 30 has not supported the linkage service. Hereinafter, individual authentication information of a user who uses the individual service A may be referred to as a piece of individual authentication information A. Moreover, individual authentication information of a user who uses the individual service B may be hereinafter referred to as a piece of individual authentication information B. In a case where it is not necessary to particularly distinguish between the pieces of individual authentication information A and B, the pieces of individual authentication information A and B are each simply referred to as individual authentication information.

An example of information stored in the user database 40 will be described with reference to FIG. 4 and FIG. 5. FIG. 4 is a diagram illustrating an example of information stored in the user database 40A. FIG. 5 is a diagram illustrating an example of information stored in the user database 40B.

As illustrated in FIG. 4, the user database 40A stores a piece of information R1 including a user ID and a password. Here, the user ID and the password are examples of information constituting the piece of individual authentication information A. The user ID uniquely identifies a user in the user database 40A. In other words, the user ID uniquely identifies a user who uses the individual service A. The password is an example of personal identification information used in combination with the user ID. In this example, the piece of information R1 includes a user ID "A@mail" and a password "P@ss".

As illustrated in FIG. 5, the user database 40B stores a piece of information R2 including a user ID and a password. As described above, the user ID and the password are examples of information constituting the piece of individual authentication information B. The user ID uniquely identifies a user in the user database 40B. In other words, the user ID uniquely identifies a user who uses the individual service B. The password is as described above. In this example, the piece of information R2 includes a user ID "officeID" and a password "p@ssword".

In the examples of FIG. 4 and FIG. 5, the password is expressed in plain text. Note, however, that personal identification information stored in the user database 40 is not necessarily stored in the form of plain text. For example, the user database 40 may store a password which has been hashed in accordance with a transformation method employed by the corresponding service server 30.

FIG. 4 and FIG. 5 show examples in which the user databases 40A and 40B have the same data structure. Note, however, that the data structures of the user databases 40A and 40B may not be identical with each other. The example is shown in which the pieces of individual authentication information A and B include the same type of personal identification information. Note, however, that types of personal identification information included in the pieces of individual authentication information A and B may not be identical with each other.

(Integrated Database 50)

The following description will discuss a configuration of the integrated database 50, with reference to FIG. 3. The integrated database 50 stores individual authentication information and integrated authentication information. The integrated database 50 is an example configuration for realizing the storage apparatus recited in claims.

For example, information stored in the integrated database 50 is registered by the linkage server 10 and is referred to by the authentication server 20. Here, "registration" means that information is stored in the integrated database 50. It is preferable that the integrated database 50 is accessible from specific apparatuses including the linkage server 10 and the authentication server 20, and is not accessible from other apparatuses. For example, in the present example embodiment, it is assumed that the integrated database 50 is not accessible from the service server 30.

An example of information stored in the integrated database 50 will be described with reference to FIG. 6. FIG. 6 is a diagram illustrating an example of information stored in the integrated database 50. As illustrated in FIG. 6, the integrated database 50 can store a piece of information R including a universally unique identifier (UUID), service identification information, a user ID, and a password. Here, the user ID and the password are examples of information constituting authentication information.

The UUID is identification information which uniquely identifies a user who is a subject of the information processing system 1A. The service identification information is identification information for identifying a service. A service identified by the service identification information here includes an individual service that is provided by the service server 30 and an integration service that is provided by the information processing system 1A. The user ID is information for identifying a user in each service. The password is as described above.

As illustrated in FIG. 6, pieces of information R3, R4, and R5, in which the UUID is the same "UUID001", are associated with each other in the integrated database 50. In other words, the piece of individual authentication information A included in the piece of information R3 and the integrated authentication information included in the piece of information R4 are registered in association with each other. Moreover, the piece of individual authentication information B included in the piece of information R5 and the integrated authentication information included in the piece of information R4 are registered in association with each other.

Hereinafter, registration of individual authentication information in the integrated database 50 in association with a UUID associated with the integrated authentication information is also expressed as follows: "The integrated authentication information and the individual authentication information are registered in the integrated database 50 in association with each other". The feature in which "The integrated authentication information and the individual authentication information are registered in the integrated database 50 in association with each other" is an example of "linking" recited in claims.

(Individual Authentication Information and Integrated Authentication Information)

The piece of information R3 illustrated in FIG. 6 includes "A" indicating the individual service A as service identification information. Hereinafter, this piece of service identification information is also referred to as a piece of service identification information A. Authentication information (ID, password) included in such a piece of information R3 corresponds to individual authentication information included in the piece of information R1 illustrated in FIG. 4. The piece of information R5 includes "B" indicating the individual service B as service identification information. Hereinafter, this piece of service identification information is also referred to as a piece of service identification information B. Authentication information (ID, password) included in such a piece of information R5 corresponds to individual authentication information included in the piece of information R2 illustrated in FIG. 5. That is, the pieces of information R3 and R5 include pieces of individual authentication information.

The piece of information R4 illustrated in FIG. 6 includes "U" indicating the integration service as service identification information. Hereinafter, this piece of service identification information is also referred to as a piece of service identification information U. Authentication information (ID, password) included in such a piece of information R4 represents the integrated authentication information. That is, the piece of information R4 includes the integrated authentication information. Details of the integrated authentication information will be described later.

In the example of FIG. 6, the password is expressed in plain text. Note, however, that personal identification information stored in the integrated database 50 is not necessarily stored in the form of plain text. For example, the integrated database 50 may store a password which has been hashed in accordance with a transformation method employed by the authentication server 20. For example, the transformation method for a password stored in the user database 40 may be or may not be identical with the transformation method for a password stored in the integrated database 50.

(Terminal 90)

The following description will discuss a configuration of the terminal 90, with reference to FIG. 3. The terminal 90 is a computer used by the user. Examples of the terminal 90 include, but not limited to, a smart phone, a tablet, a personal computer, a wearable terminal, and the like. The terminal 90 includes a display apparatus (not illustrated) or is connected to a display apparatus. The terminal 90 includes an input apparatus (not illustrated) or is connected to an input apparatus. The terminal 90 is communicably connected to the linkage server 10, the authentication server 20, and the service server 30 via the network N1. The terminal 90 transmits, via the network N1, information which has been input by the user via the input apparatus. The terminal 90 displays, on the display apparatus, information received via the network N1. If necessary, the terminal 90 causes a memory to store information to be transmitted and received via the network N1.

<Flows of Linking Method S100 and Authentication Method S200 Carried Out by Information Processing System 1A>

The information processing system 1A configured as described above carries out a linking method S100 and an authentication method S200 in accordance with the present example embodiment. The linking method S100 and the authentication method S200 are examples of the information processing method recited in claims.

(Overview of Linking Method S100)

Figure 7:
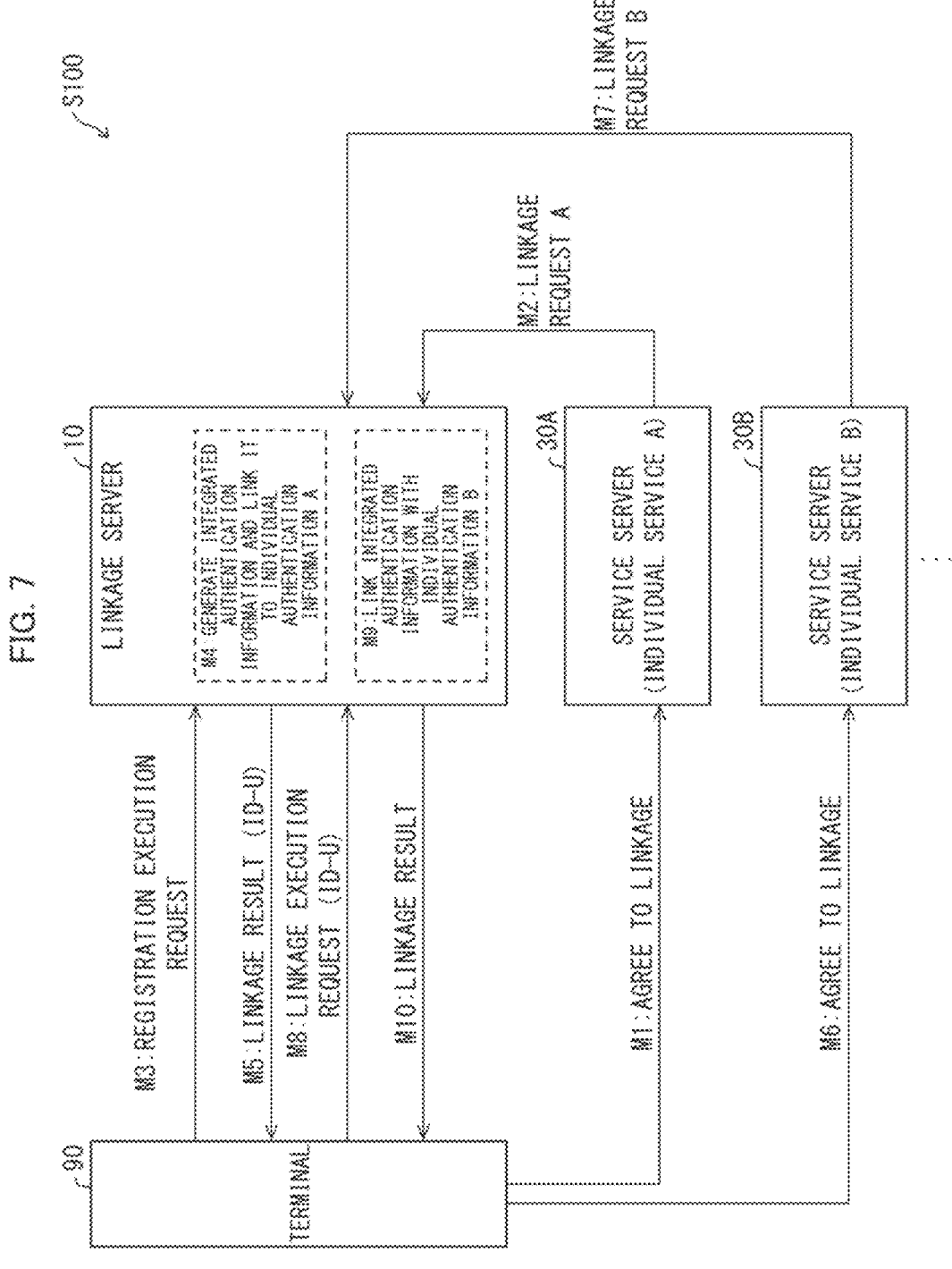
FIG. 7 is a schematic diagram illustrating an overview of a linking method in accordance with the second example embodiment of the present invention.

The following description will discuss an overview of the linking method S100, with reference to FIG. 7. FIG. 7 is a schematic diagram for describing an overview of the linking method S100. As illustrated in FIG. 7, the linking method S100 includes steps M1 through M10. Here, it is assumed that, before carrying out the linking method S100, the user of the terminal 90 has not yet possessed integrated authentication information. Moreover, it is assumed that, before carrying out the linking method S100, the user uses the individual service A using a piece of individual authentication information for the individual service A, and uses the individual service B using a piece of individual authentication information for the individual service B. In the example below, the service server 30A is an example configuration for realizing the first server recited in claims, and the service server 30B is an example configuration for realizing the second server.

(Step M1)

In step M1, the terminal 90 transmits, in accordance with operation by a user who uses the individual service A, information indicating agreement with linkage of the piece of individual authentication information A to the service server 30A.

(Step M2)

In step M2, the service server 30A transmits, to the linkage server 10, a linkage request A including the piece of individual authentication information A of the user in the individual service A. In other words, the acquisition section 111 of the linkage server 10 receives, from the service server 30A that provides the individual service A, a linkage request A (first linkage request) including the piece of individual authentication information A (first authentication information) used by the service server 30A to carry out authentication of the user.

(Step M3)

In step M3, the linkage section 112 of the linkage server 10 inquires of the terminal 90 whether or not the terminal 90 possesses integrated authentication information. In a case where the terminal 90 does not possess the integrated authentication information, the linkage section 112 transmits a registration screen. The terminal 90 transmits, to the linkage server 10, a registration execution request including information which has been input on the registration screen by user operation.

(Step M4)

In step M4, the linkage section 112 of the linkage server 10 generates, based on the linkage request A, integrated authentication information which is to be linked to the piece of individual authentication information A, and registers the piece of individual authentication information A and the integrated authentication information in the integrated database 50. Specifically, the linkage section 112 newly generates a UUID. The linkage section 112 generates integrated authentication information with reference to information which has been input by the user. The linkage section 112 registers the UUID and the integrated authentication information in the integrated database 50 in association with each other. Moreover, the linkage section 112 registers the UUID and the piece of individual authentication information A received in step M2 in the integrated database 50 in association with each other. Thus, the integrated authentication information and the piece of individual authentication information A are linked together.

(Step M5)

In step M5, the linkage section 112 causes the storage section 120 to store a session ID-U (linkage completion information) in association with the integrated authentication information. Here, the session ID-U indicates that linkage has been completed between the piece of individual authentication information A and the integrated authentication information. In this example, the linkage section 112 causes the storage section 120 to store the session ID-U and a UUID for identifying the integrated authentication information in association with each other.

The linkage section 112 transmits the linkage result to the terminal 90. The linkage result includes the integrated authentication information and the session ID-U. The terminal 90 presents the integrated authentication information to the user and causes a memory of the terminal 90 to store the session ID-U. The session ID-U is used in step M6 and the subsequent steps.

After that, with the authentication service (described later), the user can use the individual service A using any of the integrated authentication information and the piece of individual authentication information A.

(Step M6)

In step M6, the terminal 90 transmits, in accordance with operation of a user who uses the individual service B, information indicating agreement with linkage of the piece of individual authentication information B to the service server 30B.

(Step M7)

In step M7, the service server 30B transmits, to the linkage server 10, a linkage request B including the piece of individual authentication information B of the user in the individual service B. In other words, the acquisition section 111 of the linkage server 10 receives, from the service server 30B that provides the individual service B, a linkage request B (second linkage request) including the piece of individual authentication information B (second authentication information) used by the service server 30B to carry out authentication of the user.

(Step M8)

In step M8, the linkage section 112 of the linkage server 10 inquires of the terminal 90 whether or not the terminal 90 possesses integrated authentication information. In a case where the terminal 90 possesses the integrated authentication information, the terminal 90 transmits a linkage execution request including the session ID-U to the linkage server 10.

(Step M9)

In step M9, the linkage section 112 of the linkage server 10 links the piece of individual authentication information B to the integrated authentication information based on the linkage request B, and registers the piece of individual authentication information B in the integrated database 50. In this case, the session ID-U (linkage completion information) is included in the linkage request B. Therefore, the linkage section 112 links the integrated authentication information which is associated with the session ID-U to the piece of individual authentication information B.

Specifically, the linkage section 112 identifies, with reference to the storage section 120, a UUID associated with the received session ID-U. Moreover, the linkage section 112 registers the UUID and the piece of individual authentication information B received in step M7 in the integrated database 50 in association with each other. Thus, the integrated authentication information and the piece of individual authentication information B are linked together.

(Step M10)

In step M10, the linkage section 112 transmits the linkage result to the terminal 90. For example, the linkage section 112 may generate a new session ID-U and include the new session ID-U in the linkage result. In this case, the new session ID-U can be used in a case where a piece of individual authentication information used in another individual service, which is different from the individual service A and the individual service B, is linked together.

After that, with the authentication service (described later), the user can use the individual service A and the individual service B using any of the integrated authentication information, the piece of individual authentication information A, and the piece of individual authentication information B.

In the descriptions of steps M1 through M9, the piece of individual authentication information A is an example of the first authentication information recited in claims, and the linkage request A is an example of the first linkage request recited in claims. Moreover, the piece of individual authentication information B is an example of the second authentication information recited in claims, and the linkage request B is an example of the second linkage request recited in claims. The first authentication information and the first linkage request respectively refer to individual authentication information of a user who has not yet possessed the integrated authentication information, and information for requesting linkage thereof. The second authentication information and the second linkage request respectively refer to individual authentication information of a user who already possesses the integrated authentication information, and information for requesting linkage thereof.

(Flow of Linkage Process S10)

Figure 8:
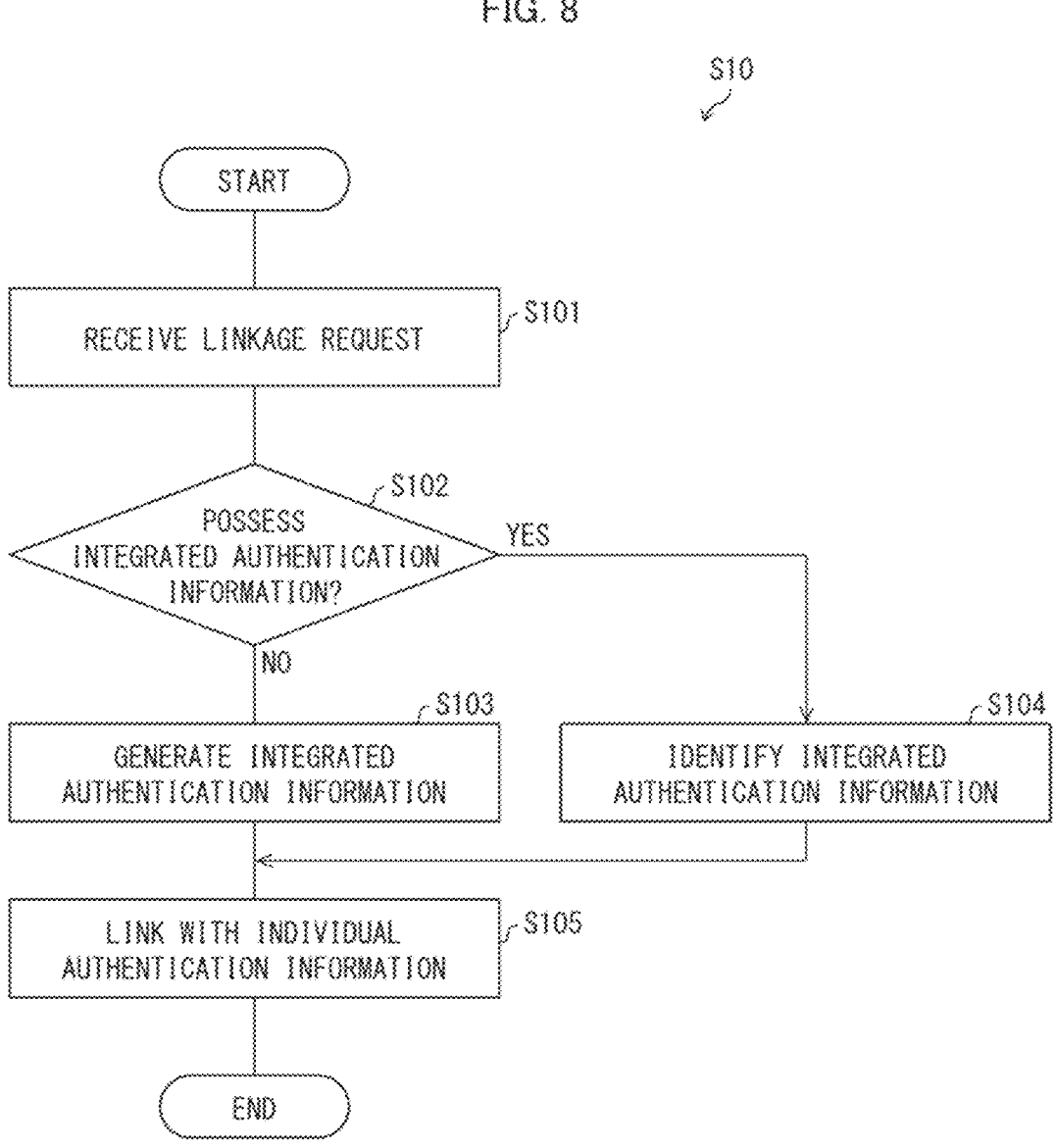
FIG. 8 is a flowchart illustrating a flow of a linkage process which is carried out by a linkage server in the linking method illustrated in FIG. 7.

The following description will discuss a flow of a linkage process S10 which is carried out by the linkage server 10 in the linking method S100, with reference to FIG. 8. FIG. 8 is a flowchart illustrating a flow of the linkage process S10. As illustrated in FIG. 8, the linkage process S10 includes steps S101 through S105.

(Step S101)

In step S101, the acquisition section 111 of the linkage server 10 receives a linkage request from the service server 30. The linkage request includes individual authentication information used by the service server 30 to carry out authentication of a user. This step S101 corresponds to step M2 or M7 of the linking method S100 described above with reference to FIG. 7. Details of this step S101 are as described in steps M2 and M7.

(Step S102)

In step S102, the linkage section 112 determines whether or not the user possesses the integrated authentication information based on information acquired from the terminal 90. This step S102 corresponds to step M3 or M8 of the linking method S100 described above with reference to FIG. 7. Details of this step S102 are as described in steps M3 and M8.

(Step S103)

In a case where it has been determined to be No in step S102, the linkage section 112 generates, in step S103, integrated authentication information which is to be linked to the individual authentication information included in the linkage request based on the linkage request received in step S101. This step S103 corresponds to a part of step M4 of the linking method S100 described above with reference to FIG. 7. Details of this step S103 are as described in step M4.

(Step S104)

In a case where it has been determined to be Yes in step S102, the linkage section 112 identifies, in step S104, integrated authentication information which is to be linked to the individual authentication information included in the linkage request based on the linkage request received in step S101. This step S104 corresponds to a part of step M9 of the linking method S100 described above with reference to FIG. 7. Details of this step S104 are as described in step M9.

(Step S105)

In step S105, the linkage section 112 registers the integrated authentication information generated in step S103 or the integrated authentication information identified in step S104 in the integrated database 50 in association with the individual authentication information. Thus, the authentication information included in the linkage request and the integrated authentication information are linked together. This step S105 corresponds to a part of step M4 and step M5 or a part of step M9 and step M10, in the linking method S100 described above with reference to FIG. 7. Details of this step S105 are as described in steps M4, M5, M9, and M10.

(Specific Example of Linking Method S100)

Figure 9:
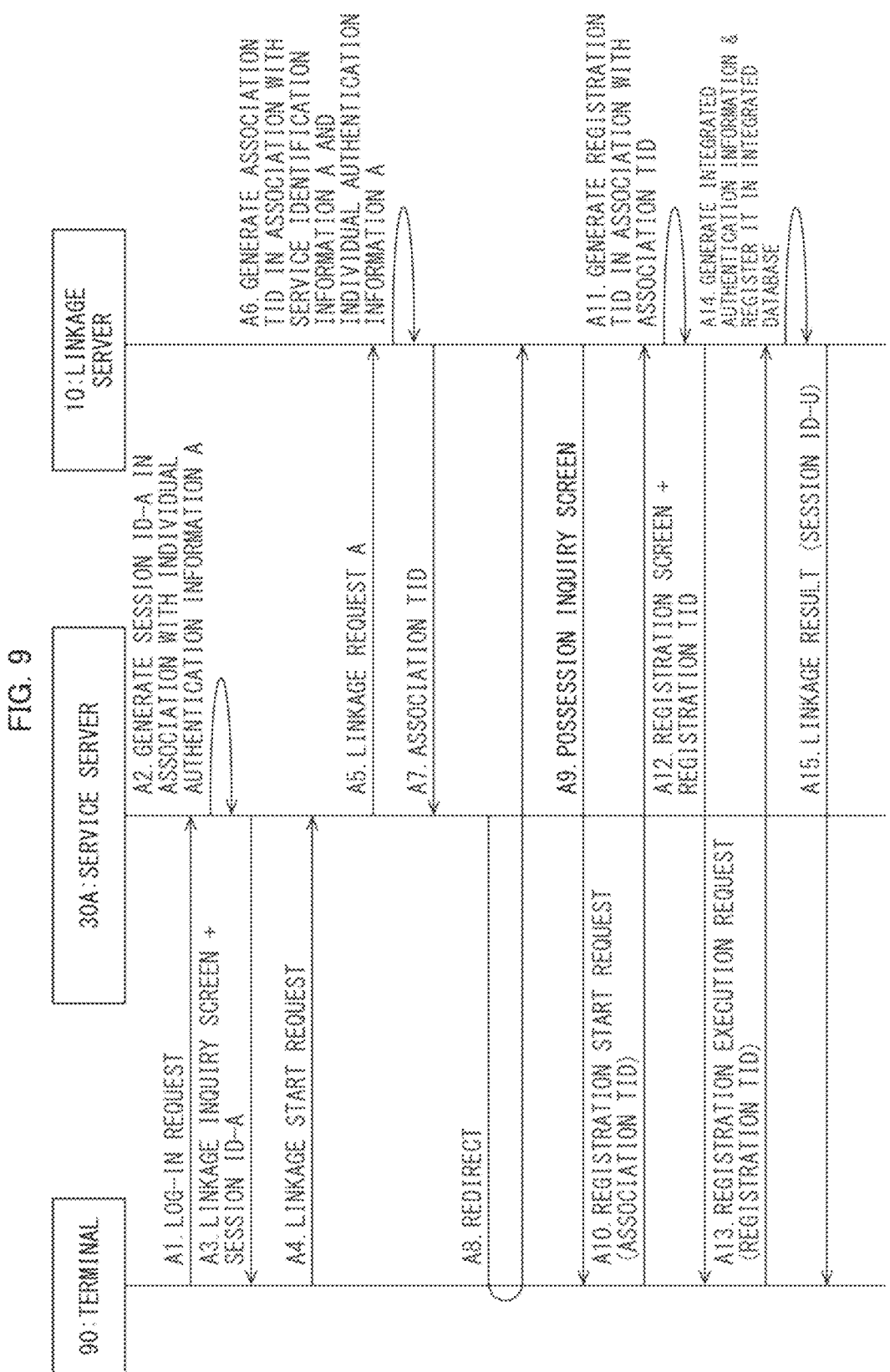
FIG. 9 is a sequence diagram illustrating an example of the linking method illustrated in FIG. 7.

The following description will discuss a specific example of the linking method S100 with reference to FIG. 9 and FIG. 10. FIG. 9 is a sequence diagram illustrating a specific example of the linking method S100, and shows an example of a flow to link a piece of individual authentication information A and integrated authentication information together. FIG. 10 is a diagram illustrating a screen example which is output to the terminal 90 in the example illustrated in FIG.

9. It is assumed that, before carrying out the specific example of the linking method S100 illustrated in FIG. 9, none of the pieces of information R3 through R5 is registered in the integrated database 50, as illustrated in the upper part of FIG. 6.

(Step A1)

Step A1 of FIG. 9 is a step in which the terminal 90 transmits a log-in request by the user to the service server 30A. In this step A1, a screen G1 illustrated in FIG. 10 is output on the display apparatus of the terminal 90. The screen G1 includes UI objects G11, G12, and G13. The UI object G11 accepts input of a user ID. The UI object G12 accepts input of a password. The UI object G13 accepts log-in operation. The user inputs a user ID and a password to the UI objects G11 and G12, and carries out operation (log-in operation) on the UI object G13. The user ID and the password input to the UI objects G11 and G12 are authentication information (here, a set of a user ID=A@mail and a password=P@ss) which is recognized by the user as the piece of individual authentication information A. Thus, the terminal 90 transmits the log-in request including the authentication information to the service server 30A.

(Step A2)

In step A2 of FIG. 9, the service server 30A collates the authentication information received from the terminal 90 with the piece of individual authentication information A stored in the user database 40A. In a case where collation has succeeded, the service server 30A determines that log-in has succeeded.

After the success of log-in, the service server 30A generates a random session ID-A, and temporarily stores the random session ID-A in a memory in association with the piece of individual authentication information A for which collation has succeeded. Here, even in a case where password included in the piece of individual authentication information A has been hashed in the user database 40A, it is preferable that the piece of individual authentication information A which is temporarily stored is kept in the form of plain text received from the terminal 90. Note that, after a predetermined valid period has elapsed, the service server 30A deletes the set of the piece of individual authentication information A and the session ID-A which have been temporarily stored. Examples of the predetermined valid period include, but not limited to, one hour.

(Step A3)

In step A3, in response to the log-in request, the service server 30A transmits, to the terminal 90, a linkage inquiry screen, the session ID-A, and information for redirection to the linkage server 10. Thus, the terminal 90 is redirected to the linkage server 10.

In this step, a screen G2 illustrated in FIG. 10 is output on the display apparatus of the terminal 90. The screen G2 includes a sentence G21 for inquiring about an agreement with linkage, a UI object G22 for accepting agreement operation, and a UI object G23 for accepting disagreement operation. Here, the sentence G21 includes, for example, content "Do you want linkage for using another service with use of authentication information (individual authentication information A) for individual service A?".

(Step A4)

In step A4, in a case where the user has carried out operation (disagreement operation) on the UI object G23, the subsequent steps are not carried out. In this case, the user continues to use the individual service A using the piece of individual authentication information A.

Meanwhile, in a case where the user has carried out operation (agreement operation) on the UI object G22, the terminal 90 transmits a linkage start request to the service server 30A. The linkage start request includes the session ID-A. In this case, processes in step A5 and the subsequent steps are carried out. In other words, the linkage section 112 of the linkage server 10 functions in a case where information indicating agreement with linkage has been input by the user. This step A4 corresponds to step M1 of the linking method S100 described above with reference to FIG. 7.

(Step A5)

In step A5, the service server 30A transmits a linkage request A to the linkage server 10. The linkage request A includes a piece of individual authentication information A and a piece of service identification information A. The piece of individual authentication information A is information temporarily stored in association with the session ID-A received from the terminal 90 in step A4. The piece of service identification information A is information for identifying the individual service A. This step A5 corresponds to step M2 of the linking method S100 described above with reference to FIG. 7.

(Step A6)

In step A6, the acquisition section 111 of the linkage server 10 generates a random association transaction ID (hereinafter, also referred to as an association TID). The acquisition section 111 causes the storage section 120 to temporarily store the association TID and the piece of service identification information A and the piece of individual authentication information A included in the linkage request A in association with each other.

(Step A7)

In step A7, the acquisition section 111 of the linkage server 10 transmits the association TID to the service server 30A.

(Step A8)

In step A8, the service server 30A transmits, to the terminal 90, the association TID and information for redirection to the linkage server 10. Thus, the terminal 90 is redirected to the linkage server 10.

(Step A9)

In step A9, the linkage section 112 of the linkage server 10 transmits a possession inquiry screen to the terminal 90. In this step A9, a screen G3 illustrated in FIG. 10 is output on the display apparatus of the terminal 90. The screen G3 includes a sentence G31 for inquiring about possession of the integrated authentication information, a UI object G32 for accepting operation to indicate possession, and a UI object G33 for accepting operation to indicate non-possession. Here, the sentence G31 includes, for example, content "Do you possess integrated authentication information?"

(Step A10)

It is assumed that, in step A10, the user has carried out operation (operation to indicate non-possession) on the UI object G33. A case in which the user has carried out operation (operation to indicate possession) on the UI object G32 will be described in "Another specific example of linking method S100" later. In this case, the terminal 90 transmits a registration start request to the linkage server 10. The registration start request includes the association TID.

(Step A11)

In step A11, the linkage section 112 of the linkage server 10 generates a random registration transaction ID (hereinafter, referred to as a registration TID) and causes the storage section 120 to temporarily store the registration TID and the association TID in association with each other.

(Step A12)

In step A12, the linkage section 112 of the linkage server 10 transmits the registration TID and a registration screen to the terminal 90. In this step A12, a screen G4 illustrated in FIG. 10 is output on the display apparatus of the terminal 90. The screen G4 includes a sentence G41 indicating that integrated authentication information is to be newly registered, a UI object G42 for accepting input of a user ID, a UI object G43 for accepting input of a password, a UI object G44 for accepting registration operation, and a UI object G45 for accepting returning operation.

(Step A13)

In step A13, the user inputs a user ID and a password to the UI objects G42 and G43, and carries out operation (registration operation) on the UI object G44. Note that the user ID and the password input to the UI objects G42 and G43 are authentication information (here, a set of a user ID=A@mail and a password=password) which the user wants to register as integrated authentication information.

Thus, the terminal 90 transmits a registration execution request to the linkage server 10. The registration execution request includes the authentication information which has been input by the user and the registration TID. This step A13 corresponds to step M3 of the linking method S100 described above with reference to FIG. 7.

In step A13, in a case where the user has carried out operation (returning operation) on the UI object G45, the subsequent steps are not carried out. In this case, the user continues to use the individual service A using the piece of individual authentication information A.

(Step A14)

In step A14, the linkage section 112 of the linkage server 10 generates a UUID for identifying a user in the integration service. The linkage section 112 generates integrated authentication information with reference to the authentication information included in the registration execution request. The authentication information included in the registration execution request is authentication information which the user wants to register.

In association with the UUID, the linkage section 112 registers the piece of service identification information A and the piece of individual authentication information A in the integrated database 50. Thus, as illustrated in the middle part of FIG. 6, a piece of information R3 is stored in the integrated database 50. The linkage section 112 registers, in association with the UUID, the piece of service identification information U for identifying the integration service and the integrated authentication information in the integrated database 50. Thus, as illustrated in the middle part of FIG. 6, a piece of information R4 is stored in the integrated database 50. This step A14 corresponds to step M4 of the linking method S100 described above with reference to FIG. 7. For example, the linkage section 112 may hash the piece of individual authentication information A and the password included in the integrated authentication information by a predetermined transformation method and then register the piece of individual authentication information A and the password in the integrated database 50.

In this step A14, the linkage section 112 identifies the piece of service identification information A and the piece of individual authentication information A which are to be registered in the integrated database 50 by tracking the registration TID and the association TID. Specifically, the linkage section 112 refers to a registration TID included in the registration execution request received in step A13, and acquires an association TID associated with the registration TID. The linkage section 112 sets the piece of service identification information A and the piece of individual authentication information A associated with the acquired association TID to be subjects of registration. After the piece of service identification information A and the piece of individual authentication information A have been registered in the integrated database 50, the linkage section 112 may discard the registration TID and the association TID.

(Step A15)

In step A15, the linkage section 112 generates a random session ID-U, and causes the storage section 120 to store the random session ID-U in association with the UUID generated in step A14. After a predetermined storage period has elapsed, the linkage section 112 may delete the session ID-U from the storage section 120. The linkage section 112 transmits a linkage result including the session ID-U to the terminal 90. This step A15 corresponds to step M5 of the linking method S100 described above with reference to FIG. 7.

The terminal 90 stores the session ID-U for a predetermined period. Details of the session ID-U will be described in "Another specific example of linking method S100" later.

Thus, the example of the process of linking the piece of individual authentication information A with the integrated authentication information is completed. Following step A15, for example, the linkage server 10 may transmit, to the terminal 90, information for redirection to the service server 30A. The redirection destination may be a menu screen of the individual service A provided by the service server 30A.

(Another Specific Example of Linking Method)

Figure 11:
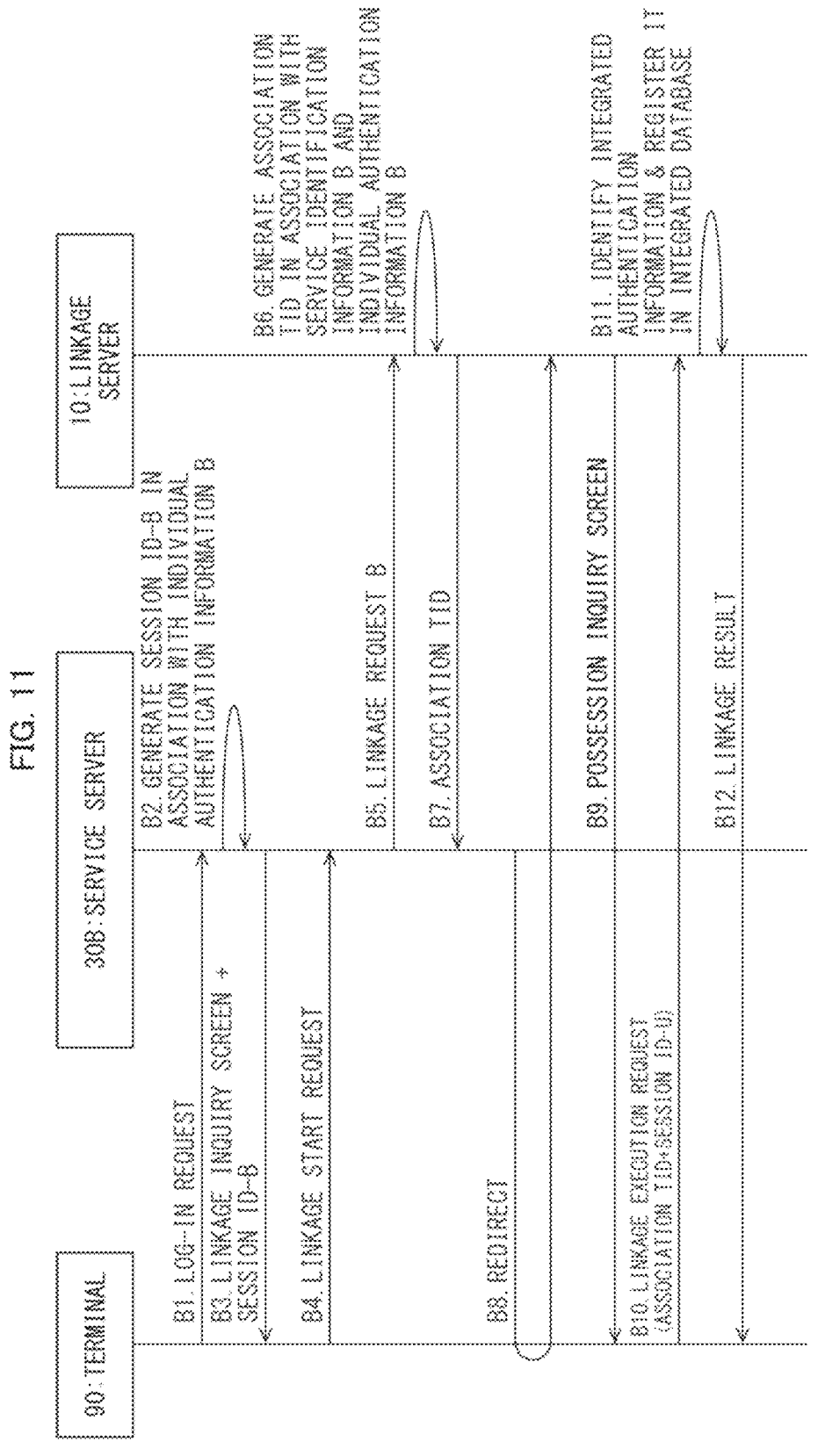
FIG. 11 is a sequence diagram illustrating another example of the linking method illustrated in FIG. 7.

The following description will discuss another specific example of the linking method S100 with reference to FIG. 11 and FIG. 12. FIG. 11 is a sequence diagram illustrating another specific example of the linking method S100, and shows an example of a flow to link a piece of individual authentication information B and integrated authentication information together. FIG. 12 is a diagram illustrating a screen example which is output to the terminal 90 in the example illustrated in FIG. 11. It is assumed that, before carrying out another specific example of the linking method S100 illustrated in FIG. 11, pieces of information R3 and R4 are registered and a piece of information R5 is not registered in the integrated database 50, as illustrated in the middle part of FIG. 6.

(Steps B1 Through B9)

In FIG. 11, a flow of steps B1 through B9 can be similarly described by replacing the letter "A" included in the reference signs with the letter "B" in the description of the flow of steps A1 through A9 described above with reference to FIG. 9.

In step B1, a screen G5 illustrated in FIG. 12 is output on the display apparatus of the terminal 90. The screen G5 can be described substantially in the same manner as the screen G1 illustrated in FIG. 10. Here, however, the user ID and the password input to the UI objects G11 and G12 are authentication information (here, a set of a user ID=officeID and a password=p@ssword) which is recognized by the user as the piece of individual authentication information B.

In step B3, a screen G6 illustrated in FIG. 12 is output on the display apparatus of the terminal 90. The screen G6 can be described in a manner similar to that of the screen G2 illustrated in FIG. 10.

In step B9, a screen G7 illustrated in FIG. 12 is output on the display apparatus of the terminal 90. The screen G7 can be described in a manner similar to that of the screen G3 illustrated in FIG. 10.

FIG. 10 and FIG. 12 illustrate the example in which the screen G1 is similar to the screen G5, the screen G2 is similar to the screen G6, and the screen G3 is similar to the screen G7. Note, however, that the present example embodiment is not limited to the identical screen pairs.

(Step B10)

It is assumed that, in step B10, the user has carried out operation (operation to indicate possession) on the UI object G32. In this case, the terminal 90 transmits a linkage execution request to the linkage server 10. The linkage execution request includes an association TID and a session ID-U. The session ID-U is information which has been stored in the memory by the terminal 90 in step A15.

A case in which the user has carried out operation (operation to indicate non-possession) on the UI object G33 is as described in "Specific example of linking method S100" above.

(Step B11)

In step B11, the linkage section 112 of the linkage server 10 identifies a UUID based on the linkage execution request. In association with the UUID, the linkage section 112 registers the piece of service identification information B and the piece of individual authentication information B in the integrated database 50. Thus, as illustrated in the lower part of FIG. 6, a piece of information R5 is stored in the integrated database 50. This step B11 corresponds to step M9 of the linking method S100 described above with reference to FIG. 7. For example, the linkage section 112 may hash the password included in the piece of individual authentication information B by a predetermined transformation method and then register the password in the integrated database 50.

In this step B11, the linkage section 112 refers to the session ID-U included in the linkage execution request, and identifies the UUID associated with the session ID-U. The linkage section 112 refers to the association TID included in the linkage execution request, and sets the piece of service identification information B and the piece of individual authentication information B associated with the association TID to be subjects of registration. After the piece of service identification information B and the piece of individual authentication information B are registered in the integrated database 50, the linkage section 112 may discard the association TID.

(Step B12)

In step B12, the linkage section 112 transmits a linkage result to the terminal 90. The linkage result may include information indicating completion of linkage. The linkage result may include a new session ID-U. In this case, the new session ID-U can be used for linkage of individual authentication information in a service which is different from the individual service A and the individual service B.

In this case, the linkage section 112 deletes the session ID-U stored in the storage section 120 and generates a new session ID-U. The linkage section 112 causes the storage section 120 to store the new session ID-U in association with the UUID which has been identified in step B11. After a predetermined storage period has elapsed, the linkage section 112 may delete the new session ID-U from the storage section 120.

Thus, the example of the process of linking the piece of individual authentication information B with the integrated authentication information is completed. As described in step A15, the terminal 90 may be redirected to the service server 30B after step B12.

(Overview of Authentication Method S200)

Figure 13:
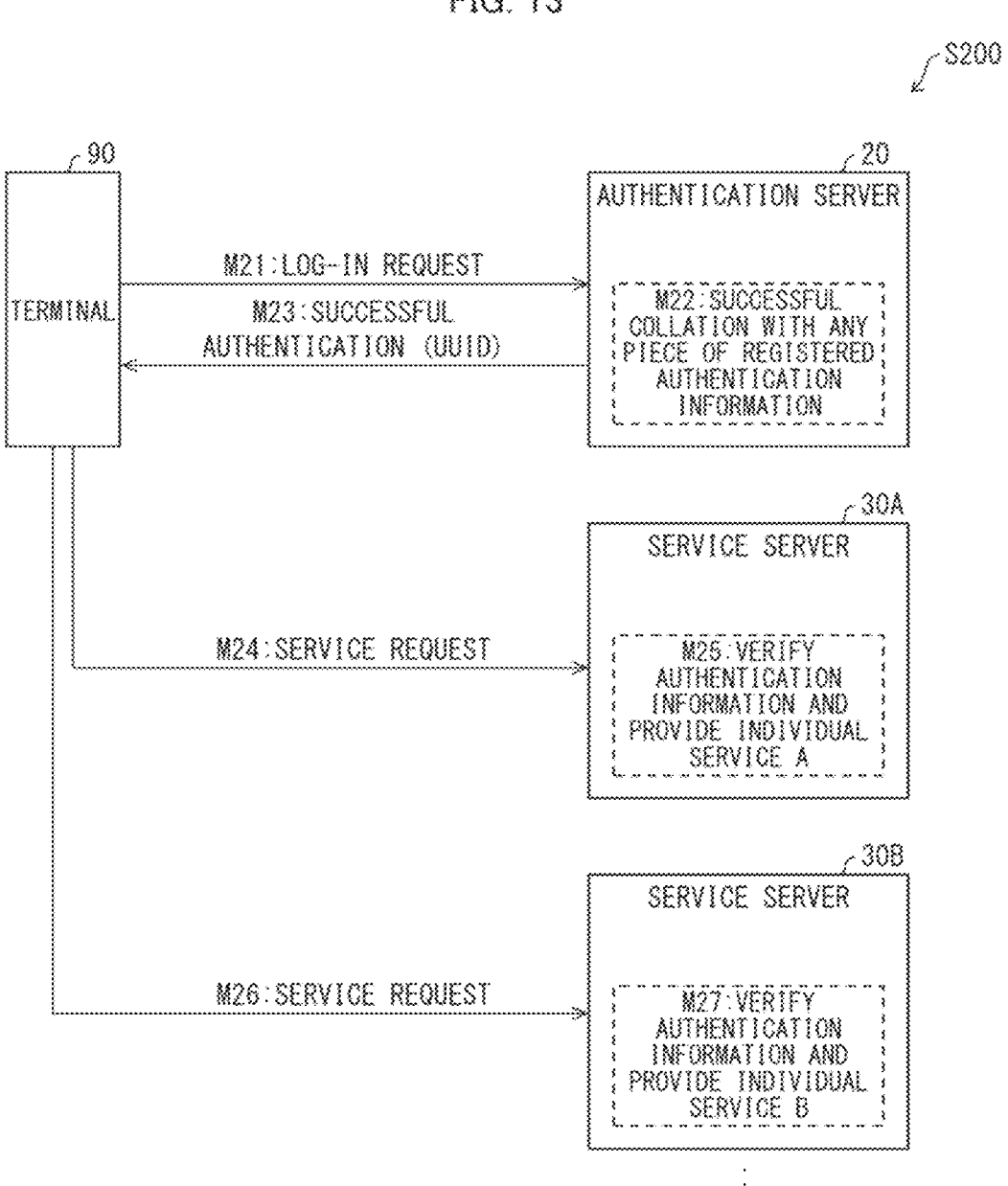
FIG. 13 is a schematic diagram illustrating an overview of an authentication method in accordance with the second example embodiment of the present invention.
Figure 14:
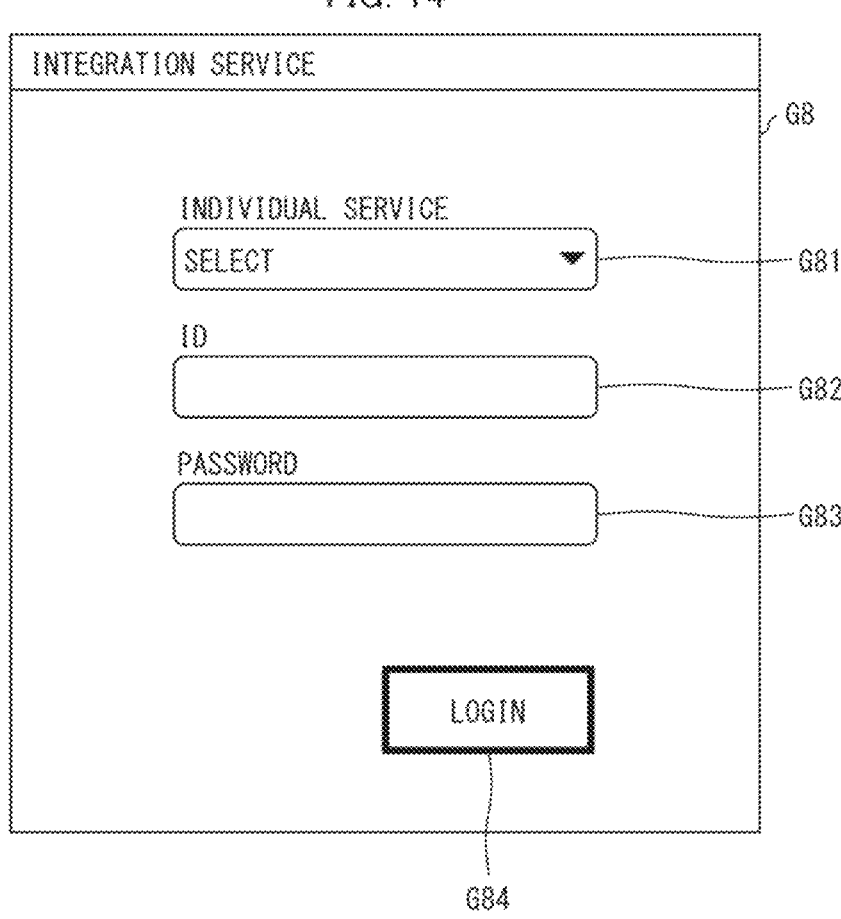
FIG. 14 is a diagram illustrating a screen example which is output to a terminal in the authentication method illustrated in FIG. 13.

The following description will discuss an overview of the authentication method S200 with reference to FIG. 13 and FIG. 14. FIG. 13 is a schematic diagram for describing an overview of the authentication method S200. FIG. 14 is a diagram illustrating a screen example which is output to the terminal 90 in the authentication method S200. As illustrated in FIG. 13, the authentication method S200 includes steps M21 through M27. Here, it is assumed that the linking method S100 has been carried out before carrying out the authentication method S200. In other words, an example will be described in which the user of the terminal 90 already possesses the integrated authentication information, linkage of the piece of individual authentication information A with the integrated authentication information has been completed, and linkage of the piece of individual authentication information B and the integrated authentication information has been completed.

(Step M21)

In step M21, the terminal 90 transmits a log-in request to the authentication server 20 in accordance with operation by the user. The log-in request includes authentication information which has been input for using the individual service A or the individual service B. Thus, the authentication section 211 of the authentication server 20 acquires authentication information which has been input by the user to use the individual service A or the individual service B.

In this step M21, a screen G8 illustrated in FIG. 14 is displayed on the display apparatus of the terminal 90. The screen G8 is a screen generated by the authentication server 20 (integration service). The screen G8 includes UI objects G81, G82, G83, and G84. The UI object G81 accepts operation of selecting an individual service (in this example, one of the individual service A and the individual service B). The UI object G82 accepts input of a user ID. The UI object G83 accepts input of a password. The UI object G84 accepts log-in operation. The user selects, by operating the UI object G81, an individual service to use. The user also inputs a user ID and a password to the UI objects G82 and G83, and carries out operation (log-in operation) on the UI object G84. Thus, the terminal 90 transmits, to the authentication server 20, a log-in request including the pieces of input information which have been accepted by the UI objects G81, G82, and G83. The input information includes service identification information of the selected individual service and authentication information which has been input.

Note that the screen G8 may be displayed on the terminal 90 when the user operates the terminal 90 to connect directly to the authentication server 20. The screen G8 may be displayed on the terminal 90 when the user operates the terminal 90 to connect to the service server 30, and redirection from the service server 30 to the authentication server 20 is carried out.

(Step M22)

In step M22, the authentication section 211 of the authentication server 20 carries out collation between (i) the input authentication information and (ii) at least one selected from the group consisting of the integrated authentication information, the piece of individual authentication information A (first authentication information), and the piece of individual authentication information B (second authentication information) which are stored in the integrated database 50. In a case where collation with the at least one has succeeded, the authentication section 211 determines that authentication of the user has succeeded.

For example, the authentication section 211 carries out collation by determining whether or not information including service identification information included in the log-in request, a user ID, and a password is stored in the integrated database 50. In a case where the information is stored, the authentication section 211 determines that authentication has succeeded. In a case where the information is not stored, the authentication section 211 determines that authentication has not succeeded.

For example, it is assumed that, in the screen G8 illustrated in FIG. 14, the user has selected "individual service A" and input "officeID" and "p@ssword" corresponding to the piece of individual authentication information B. In this case, the piece of service identification information A and the piece of information R5 including "officeID" and "p@ssword" which are included in the input information are stored in the integrated database 50. Therefore, the authentication section 211 determines that authentication of the user identified by UUID001 has succeeded.

(Step M23)

In step M23, in a case where authentication of the user has succeeded, the authentication section 211 of the authentication server 20 generates authentication success information for permitting use of the individual service A or the individual service B. The authentication section 211 transmits the generated authentication success information to the terminal 90. Here, the authentication success information includes a UUID of the user for whom authentication has succeeded. Moreover, the authentication success information includes a valid period. The authentication success information is information whose validity can be verified by the service server 30. For example, the authentication success information may be a token signed by the authentication server 20. The authentication success information is not limited to this example, and is generated by employing a known technique that can verify validity.

(Step M24)

In step M24, the terminal 90 connects to the service server 30A based on operation by the user, and transmits a service request to the service server 30A. The service request includes authentication success information received from the authentication server 20. It is assumed that a point in time when step M24 is carried out is within the valid period of the authentication success information.

(Step M25)

In step M25, the service server 30A verifies the authentication success information included in the service request. In a case where validity is confirmed, the service server 30A provides the individual service A to the user via the terminal 90.

(Step M26)

In step S26, the terminal 90 connects to the service server 30B based on operation by the user, and transmits a service request to the service server 30B. The service request includes the authentication success information received from the authentication server 20. It is assumed that a point in time when step M26 is carried out is within the valid period of the authentication success information.

(Step M27)

In step M27, the service server 30B verifies the authentication success information included in the service request. In a case where validity is confirmed, the service server 30B provides the individual service B to the user via the terminal 90.

In steps M25 and M27, the service server 30 identifies a user ID of an individual service corresponding to a UUID included in the authentication success information, and provides the individual service using the identified user ID. In this case, the service server 30 may acquire, by making an inquiry to the linkage server 10, the user ID of the individual service corresponding to the UUID included in the authentication success information. The service server 30 may cause the user database 40 to store the UUID in association with the user ID of the individual service for which linkage has been completed. In this case, the service server 30 can acquire, with reference to the user database 40, the user ID of the individual service corresponding to the UUID included in the authentication success information.

(Flow of Authentication Process S20)

The following description will discuss a flow of an authentication process S20 which is carried out by the authentication server 20 in the authentication method S200, with reference to FIG. 15. FIG. 15 is a flowchart for describing a flow of the authentication process S20. As illustrated in FIG. 15, the authentication process S20 includes steps S201 through S203.

(Step S201)

In step S201, the authentication section 211 of the authentication server 20 acquires authentication information which has been input by the user to use the individual service A or the individual service B. This step S201 corresponds to step M21 of the authentication method S200 described above with reference to FIG. 13. Details of this step S201 are as described in step M21.

(Step S202)

In step S202, the authentication section 211 determines whether or not collation succeeds between (i) the input authentication information and (ii) at least one selected from the group consisting of the integrated authentication information, the piece of individual authentication information A (first authentication information), and the piece of individual authentication information B (second authentication information) which are stored in the integrated database 50. This step S202 corresponds to step M22 of the authentication method S200 described above with reference to FIG. 13. Details of this step S202 are as described in step M22. In a case where it has been determined to be No in step S202, the authentication process S20 ends.

(Step S203)

In a case where it has been determined to be Yes in step S202, step S203 is carried out. In step S203, in a case where authentication of the user has succeeded, the authentication section 211 generates authentication success information for permitting use of the individual service A or the individual service B. The authentication section 211 transmits the generated authentication success information to the terminal 90. This step S203 corresponds to step M23 of the authentication method S200 described above with reference to FIG. 13. Details of this step S203 are as described in step M23.

Thus, the terminal 90 can transmit a service request to the service server 30 using the authentication success information received from the authentication server 20.

Example Advantage of Present Example Embodiment

As described above, in the present example embodiment, the linkage request A including the piece of individual authentication information A used by the service server 30A to carry out authentication of a user is acquired from the service server 30A which provides the individual service A, and the linkage request B including the piece of individual authentication information B used by the service server 30B to carry out authentication of the user is further acquired from the service server 30B which provides the individual service B different from the individual service A. Moreover, in the present example embodiment, integrated authentication information which is to be linked to the piece of individual authentication information A is generated based on the linkage request A, and the piece of individual authentication information A and the integrated authentication information are stored in the integrated database 50. In addition, the integrated authentication information is linked to the piece of individual authentication information B based on the linkage request B, and the piece of individual authentication information B is stored in the integrated database 50.

Therefore, information obtained by linking integrated authentication information to individual authentication information is registered in the integrated database 50 based on a linkage request from the service server 30, which provides each individual service, to the linkage server 10. As a result, for an existing user who has used a plurality of individual services, labor to link pieces of individual authentication information together which have been registered in the respective individual services is reduced. Thus, according to the present example embodiment, it is possible to bring about an example advantage of allowing a plurality of individual services that have not supported linkage of authentication information to newly support the linkage service, while reducing burdens on existing users who have used such a plurality of individual services.

In the present example embodiment, linkage completion information (session ID-U) indicating that linkage has been completed between the individual authentication information and the integrated authentication information is stored in association with the integrated authentication information. In a case where the linkage request B includes linkage completion information, the integrated authentication information associated with the linkage completion information is linked to the piece of individual authentication information B.

Therefore, it is possible to identify integrated authentication information of a user who already possesses integrated authentication information, using linkage completion information without newly carrying out authentication. As a result, in a case where individual authentication information is to be linked to the integrated authentication information which has already been possessed, the user can carry out linkage without newly carrying out an authentication procedure.

In the present example embodiment, in a case where collation has succeeded between (i) authentication information which has been input by a user for using the individual service A or the individual service B and (ii) at least one selected from the group consisting of the integrated authentication information, the piece of individual authentication information A, and the piece of individual authentication information B stored in the integrated database 50, it is determined that authentication of the user has succeeded. In the present example embodiment, in a case where authentication of the user has succeeded, authentication success information for permitting use of the individual service A or the individual service B is generated.

Therefore, when using the individual service A or the individual service B, the user may use the familiar piece of individual authentication information A or piece of individual authentication information B, or may use the integrated authentication information. As a result, it is not necessary for the user to memorize pieces of individual authentication information different for respective individual services. In addition, the user can continue to use the familiar piece of individual authentication information A or piece of individual authentication information B. As a result, a burden on the user is greatly reduced.

The linkage section 112 in the present example embodiment functions in a case where information indicating agreement with linkage has been input by a user.

Therefore, if the user does not agree to linkage, the user can continue to use the individual authentication information registered in the individual service.

Moreover, in the present example embodiment, integrated authentication information is generated with reference to information which has been input by the user.

Therefore, the user can register information which has been input by himself/herself as the integrated authentication information for use in linkage.

[Variation 1]

Figure 16:
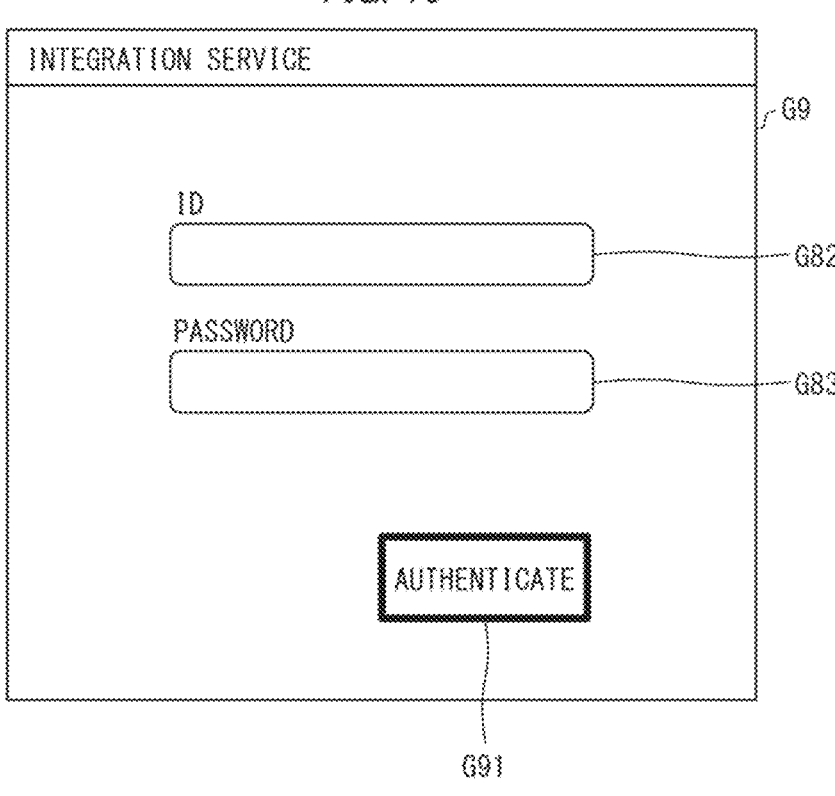
FIG. 16 is a diagram illustrating a variation of the screen illustrated in FIG. 14.

The present example embodiment can be altered such that, in the authentication server 20, the authentication process can be carried out without selection of an individual service. The following description will discuss a screen example which is displayed in this case on the display apparatus of the terminal 90, with reference to FIG. 16. FIG. 16 is a diagram illustrating a screen example which is displayed on the terminal 90 in this variation. In this variation, in step M21, a screen G9 illustrated in FIG. 16 is displayed in place of the screen G8 illustrated in FIG. 14. The screen G9 includes, similarly to the screen G8, the UI objects G82 and G83 for accepting input of a user ID and a password. Note, however, that the screen G9 does not include the UI object G81 for accepting selection of an individual service. Moreover, the screen G9 includes a UI object G91 for accepting authentication operation, in place of the UI object G83 for accepting log-in operation. In this case, the terminal 90 transmits, in place of a log-in request, an authentication request including authentication information which has been input.

For example, it is assumed that pieces of information can be identified in the integrated database 50 based on combinations of user IDs and passwords. In this case, the authentication section 211 carries out collation by determining whether or not information including authentication information (i.e., a set of a user ID and a password) included in the authentication request is stored in the integrated database 50. In a case where the information is stored, the authentication section 211 determines that authentication has succeeded. In a case where the information is not stored, the authentication section 211 determines that authentication has not succeeded.

In this case, this variation makes it possible to carry out authentication of a user in a situation in which the user does not use an individual service.

For example, the authentication section 211 may carry out the collation process using the authentication information included in the authentication request and predetermined service identification information. For example, the predetermined service identification information may be set in advance, or may be dynamically decided in accordance with a use status of an individual service by the user. In this case, in a case where information including the predetermined service identification information and the authentication information included in the authentication request is stored in the integrated database 50, the authentication section 211 determines that authentication has succeeded. In a case where the information is not stored, the authentication section 211 determines that authentication has not succeeded.

In this case, this variation makes it possible to carry out authentication of a user while reducing labor of the user to select an individual service.

[Variation 2]

The present example embodiment can be altered such that the linkage section 112 of the linkage server 10 registers attribute information of a user in the integrated database 50 in association with integrated authentication information.

Figure 17:
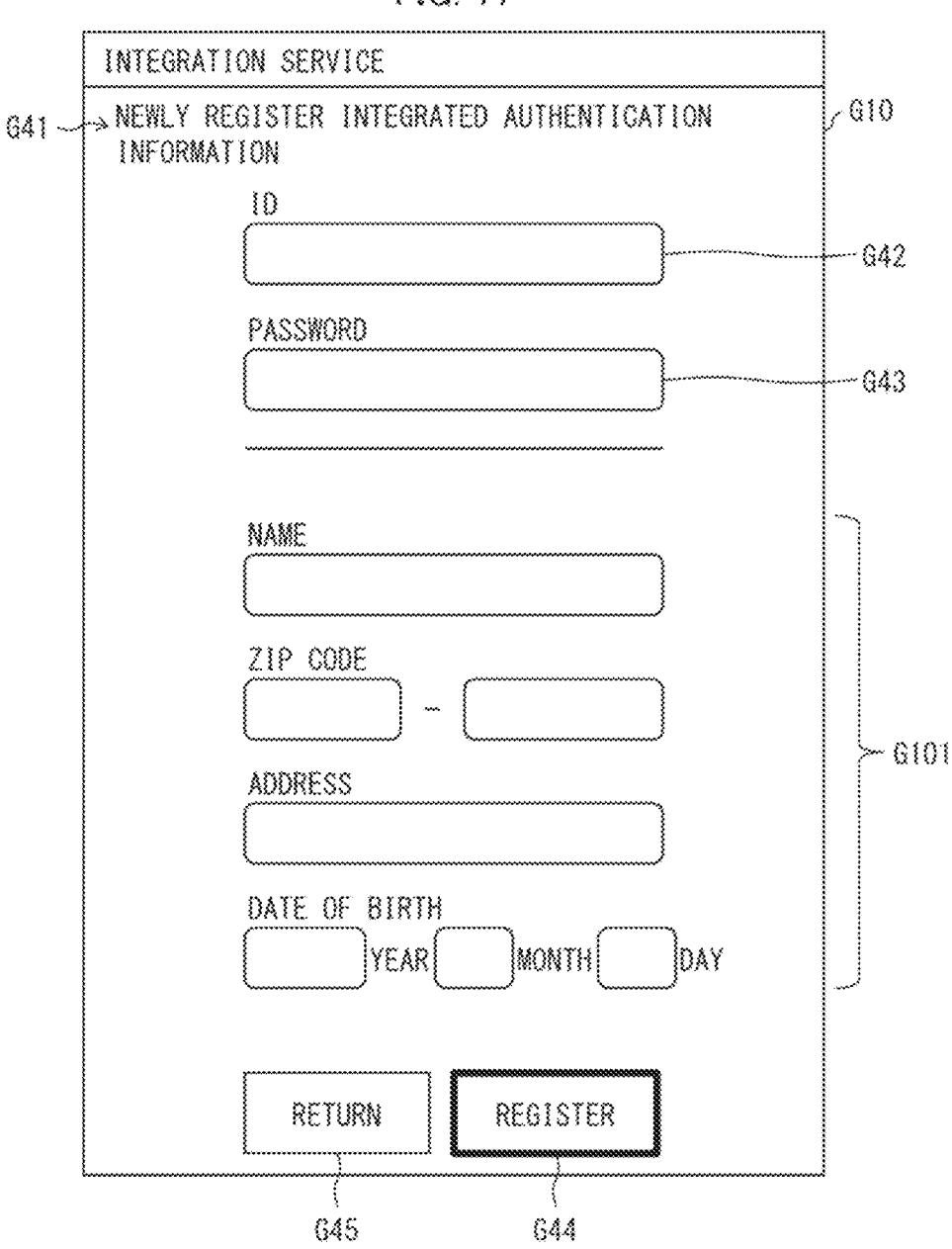
FIG. 17 is a diagram illustrating a variation of the screen illustrated in FIG. 10.

For example, the linkage section 112 may acquire, in addition to input authentication information which the user intends to register as integrated authentication information, attribute information by input of the user. The following description will discuss a screen example which is displayed in this case on the terminal 90, with reference to FIG. 17. FIG. 17 is a diagram illustrating a screen example which is displayed on the terminal 90 in this variation. As illustrated in FIG. 17, in this variation, a screen G10 illustrated in FIG. 17 is displayed on the display apparatus of the terminal 90, in place of the screen G4 illustrated in FIG. 10. The screen G10 includes a UI object group G101 in addition to UI objects G41 through G45 similar to those in the screen G4. The UI object group G101 accepts input of attributes of a user such as a name, a zip code, an address, and a telephone number.

The linkage section 112 generates a UUID and integrated authentication information based on authentication information input on the screen G10. In association with the UUID, the linkage section 112 registers the integrated authentication information and the attribute information in the integrated database 50. Thus, this variation makes it possible to store attribute information which is of a user who uses a plurality of individual services and which can be provided to an operator of each of the individual services.

[Variation 3]

The present example embodiment can be altered such that a UUID functions as integrated authentication information. In this case, the integrated database 50 illustrated in FIG. 6 does not need to store the piece of information R4 including the piece of service identification information U indicating the integration service. Moreover, in this case, the terminal 90 does not need to display the screen G4 for new registration illustrated in FIG. 10. In this case, the authentication section 211 of the authentication server 20 determines that authentication of the user has succeeded in a case where collation has succeeded between (i) the authentication information which has been input by the user and (ii) at least one selected from the group consisting of the piece of individual authentication information A and the piece of individual authentication information B stored in the integrated database 50.

In this variation, steps A12 and A13 illustrated in FIG. 9 are omitted. For example, in step A14, the linkage section 112 generates a UUID (integrated authentication information) and registers individual authentication information in the integrated database 50 in association with the UUID.

In this variation, it is possible to reduce labor of a user to register new integrated authentication information.

[Variation 4]

The present example embodiment can be altered to generate, as integrated authentication information, information identical to individual authentication information. In this case, for example, in the screen G4 for new registration in FIG. 10, individual authentication information may have been input in advance in the UI objects G42 and G43. Alternatively, similarly to Variation 2, steps A12 and A13 illustrated in FIG. 9 may be omitted, and in step A15, the linkage section 112 may generate, as integrated authentication information, information identical with the individual authentication information.

In this variation, it is possible to reduce labor of a user to register new integrated authentication information.

[Variation 5]

The present example embodiment can be altered such that, in FIG. 10 and FIG. 12, the screens G3 and G7 for confirming possession of integrated authentication information are not displayed. In this case, the following configuration may be employed: in step A9 or B9, the linkage section 112 inquires of the terminal 90 whether or not the terminal 90 possesses a session ID-U; in a case where the terminal 90 does not possess the session ID-U, the linkage section 112 carries out processes in step A10 and the subsequent steps; and in a case where the terminal 90 possesses the session ID-U, the linkage section 112 carries out steps B10 and the subsequent steps.

[Variation 6]

The present example embodiment can be altered such that, in a case where a user possesses integrated authentication information, authentication of the user is carried out by the authentication server 20 before carrying out step B10 of FIG. 11. In this case, integrated authentication information (or a corresponding UUID) to be linked can be identified without using a session ID-U. For example, this variation functions in a case where the linkage execution request received in step B10 does not include a session ID-U or the valid period of the session ID-U has expired. In this case, the linkage section 112 may transmit the screen G4 (FIG. 10) or the screen G9 (FIG. 16) for authentication to the terminal 90. In a case where authentication of the user has succeeded based on information input on the screen G4 or the screen G9, the linkage section 112 carries out processes in step B11 and the subsequent steps. In this case, the linkage section 112 may generate a new session ID-U and transmit the new session ID-U to the terminal 90.

[Variation 7]

In the present example embodiment, the number of services provided by a single service server 30 is not limited to one, and may be two or more. In this case, user databases 40 are provided for the respective services. A service server 30 which provides a plurality of services is connected to a plurality of user databases 40 corresponding to the respective plurality of services.

[Software Implementation Example]

Some or all of the functions of each of the information processing systems 1 and 1A may be implemented by hardware such as an integrated circuit (IC chip), or may be implemented by software.

Figure 18:
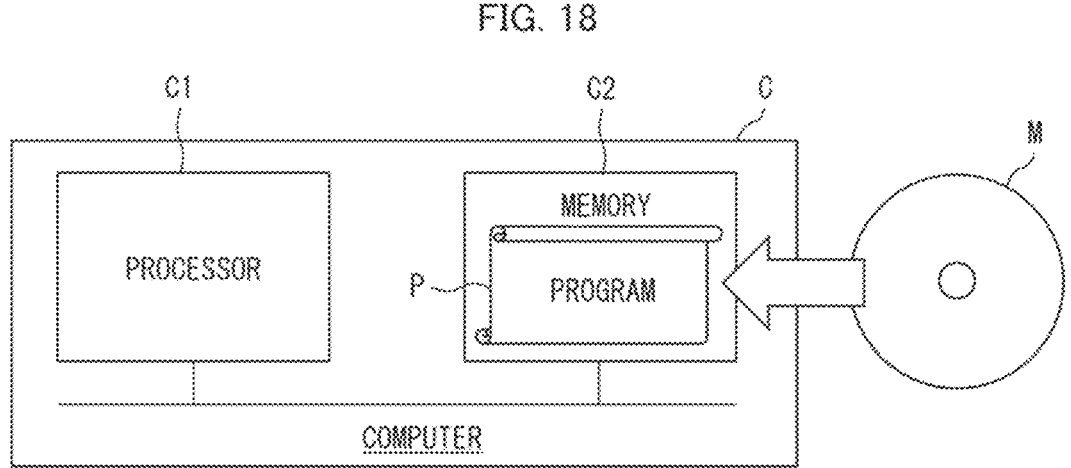
FIG. 18 is a diagram illustrating a hardware configuration example of apparatuses which constitute the information processing system in accordance with each example embodiment.

In the latter case, each of the apparatuses constituting the information processing systems 1 and 1A is implemented by, for example, a computer that executes instructions of a program that is software realizing the foregoing functions. FIG. 18 illustrates an example of such a computer (hereinafter, referred to as "computer C"). The computer C includes at least one processor C1 and at least one memory C2. The memory C2 stores a program P for causing the computer C to function as each of the apparatuses constituting the information processing systems 1 and 1A. In the computer C, the processor C1 reads the program P from the memory C2 and executes the program P, so that the functions of the apparatuses constituting the information processing systems 1 and 1A are implemented.

Examples of the processor C1 include a central processing unit (CPU), a graphic processing unit (GPU), a digital signal processor (DSP), a micro processing unit (MPU), a floating point number processing unit (FPU), a physics processing unit (PPU), a microcontroller, and a combination thereof. Examples of the memory C2 include a flash memory, a hard disk drive (HDD), a solid state drive (SSD), and a combination thereof.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a computer C-readable, non-transitory, and tangible storage medium M. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communication network, a broadcast wave, or the like. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some or all of the foregoing example embodiments can also be described as below. Note, however, that the present invention is not limited to the following supplementary notes.

(Supplementary Note 1)

An information processing system, including: an acquisition means for acquiring a first linkage request from a first server that provides a first service, the first linkage request including first authentication information used by the first server to carry out authentication of a user; and a linkage means for generating, based on the first linkage request, integrated authentication information which is to be linked to the first authentication information, and causing a storage apparatus to store the first authentication information and the integrated authentication information.

(Supplementary Note 2)

The information processing system according to supplementary note 1, in which: the acquisition means further acquires a second linkage request from a second server that provides a second service which is different from the first service, the second linkage request including second authentication information used by the second server to carry out authentication of the user; and the linkage means links the second authentication information to the integrated authentication information based on the second linkage request, and causes the storage apparatus to store the second authentication information.

(Supplementary Note 3)

The information processing system according to supplementary note 2, in which: the linkage means stores linkage completion information in association with the integrated authentication information, the linkage completion information indicating completion of linkage between the first authentication information and the integrated authentication information; and in a case where the linkage completion information is included in the second linkage request, the linkage means links the second authentication information to the integrated authentication information associated with the linkage completion information.

(Supplementary Note 4)

The information processing system according to supplementary note 2 or 3, further including: an authentication means for determining that authentication of the user has succeeded in a case where collation has succeeded between (i) authentication information which has been input by the user for using the first service or the second service and (ii) at least one selected from the group consisting of the integrated authentication information, the first authentication information, and the second authentication information which are stored in the storage apparatus.

(Supplementary Note 5)

The information processing system according to supplementary note 4, in which: in a case where authentication of the user has succeeded, the authentication means generates authentication success information for permitting use of the first service or the second service.

(Supplementary Note 6)

The information processing system according to any one of supplementary notes 1 through 5, in which: the linkage means functions in a case where information indicating agreement with linkage has been input by the user.

(Supplementary Note 7)

The information processing system according to any one of supplementary notes 1 through 6, in which: the linkage means generates the integrated authentication information with reference to information which has been input by the user.

(Supplementary Note 8)

The information processing system according to any one of supplementary notes 1 through 7, in which: the linkage means causes the storage apparatus to store attribute information of the user in association with the integrated authentication information.

(Supplementary Note 9)

An information processing method, including: acquiring a first linkage request from a first server that provides a first service, the first linkage request including first authentication information used by the first server to carry out authentication of a user; and generating, based on the first linkage request, integrated authentication information which is to be linked to the first authentication information, and causing a storage apparatus to store the first authentication information and the integrated authentication information.

(Supplementary Note 10)

A program for causing a computer to function as an information processing system, the program causing the computer to function as: an acquisition means for acquiring a first linkage request from a first server that provides a first service, the first linkage request including first authentication information used by the first server to carry out authentication of a user; and a linkage means for generating, based on the first linkage request, integrated authentication information which is to be linked to the first authentication information, and causing a storage apparatus to store the first authentication information and the integrated authentication information.

[Additional Remark 3]

Furthermore, some of or all of the foregoing example embodiments can also be expressed as below.

An information processing system, including at least one processor, the at least one processor carrying out: an acquisition process of acquiring a first linkage request from a first server that provides a first service, the first linkage request including first authentication information used by the first server to carry out authentication of a user; and a linkage process of generating, based on the first linkage request, integrated authentication information which is to be linked to the first authentication information, and causing a storage apparatus to store the first authentication information and the integrated authentication information.

Note that the information processing system can further include a memory. The memory can store a program for causing the at least one processor to carry out the acquisition process and the linkage process. The program can be stored in a computer-readable non-transitory tangible storage medium.

REFERENCE SIGNS LIST 1, 1A: Information processing system
1, 2, 3, 4, 5, 6, 7, 8, 9, 10: Supplementary note
10: Linkage server
11, 111: Acquisition section
12, 112: Linkage section
20: Authentication server
211: Authentication section
30, 30A, 30B: Service server
40, 40A, 40B: User database
50: Integrated database
90: Terminal
110, 210: Control section
120, 220: Storage section
130, 230: Communication section
C1: Processor
C2: Memory
N1: Network

What is claimed is:

1. An information processing system, comprising at least one processor, the at least one processor being configured to carry out:

an acquisition process comprising acquiring a first linkage request from a first server that provides a first service, the first linkage request including first authentication information used by the first server to carry out authentication of a user; and a linkage process comprising generating, based on the first linkage request, integrated authentication information which is to be linked to the first authentication information, and causing a storage apparatus to store the first authentication information and the integrated authentication information, wherein:

in the acquisition process, the at least one processor further acquires a second linkage request from a second server that provides a second service which is different from the first service, the second linkage request including second authentication information used by the second server to carry out authentication of the user; and in the linkage process, the at least one processor links the second authentication information to the integrated authentication information based on the second linkage request, and causes the storage apparatus to store the second authentication information.

2. The information processing system according to claim 1, wherein:

in the linkage process, the at least one processor stores linkage completion information in association with the integrated authentication information, the linkage completion information indicating completion of linkage between the first authentication information and the integrated authentication information; and

30 in a case where the linkage completion information is included in the second linkage request, in the linkage process, the at least one processor links the second authentication information to the integrated authentication information associated with the linkage completion information.

3. The information processing system according to claim 1, wherein:

the at least one processor further carries out an authentication process comprising determining that authentication of the user has succeeded in a case where collation has succeeded between (i) authentication information which has been input by the user for using the first service or the second service and (ii) at least one selected from the group consisting of the integrated authentication information, the first authentication information, and the second authentication information which are stored in the storage apparatus.

4. The information processing system according to claim 3, wherein:

in a case where authentication of the user has succeeded, in the authentication process, the at least one processor generates authentication success information for permitting use of the first service or the second service.

5. The information processing system according to claim 1, wherein:

in the linkage process, the at least one processor causes the linkage process to function in a case where information indicating agreement with linkage has been input by the user.

6. The information processing system according to claim 1, wherein:

in the linkage process, the at least one processor generates the integrated authentication information with reference to information which has been input by the user.

7. The information processing system according to claim 1, wherein:

in the linkage process, the at least one processor causes the storage apparatus to store attribute information of the user in association with the integrated authentication information.

8. An information processing method, comprising:

acquiring a first linkage request from a first server that provides a first service, the first linkage request including first authentication information used by the first server to carry out authentication of a user; and generating, based on the first linkage request, integrated authentication information which is to be linked to the first authentication information, and causing a storage apparatus to store the first authentication information and the integrated authentication information, wherein:

the acquiring comprises acquiring a second linkage request from a second server that provides a second service which is different from the first service, the second linkage request including second authentication information used by the second server to carry out authentication of the user; and the generating comprises linking to the second authentication formation to the integrated authentication information based on the second linkage request, and causes the storage apparatus to store the second authentication information.

9. A non-transitory storage medium storing a program for causing a computer to function as an information processing system, the program causing the computer to carry out:

an acquisition process comprising acquiring a first linkage request from a first server that provides a first service, the first linkage request including first authentication information used by the first server to carry out authentication of a user; and a linkage process comprising generating, based on the first linkage request, integrated authentication information which is to be linked to the first authentication information, and causing a storage apparatus to store the first authentication information and the integrated authentication information wherein:

in the acquisition process, the computer further acquires a second linkage request from a second server that provides a second service which is different from the first service, the second linkage request including second authentication information used by the second server to carry out authentication of the user; and in the linkage process, the computer links the second authentication information to the integrated authentication information based on the second linkage request, and causes the storage apparatus to store the second authentication information.

\* \* \* \* \*